(12) United States Patent
Xing et al.

(10) Patent No.: US 12,089,124 B2
(45) Date of Patent: Sep. 10, 2024

(54) COMMUNICATION METHOD, APPARATUS, AND SYSTEM

(71) Applicant: Huawei Technologies Co., Ltd., Shenzhen (CN)

(72) Inventors: Weijun Xing, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 17/550,426

(22) Filed: Dec. 14, 2021

(65) Prior Publication Data

US 2022/0103990 A1 Mar. 31, 2022

Related U.S. Application Data

(63) Continuation of application No. PCT/CN2020/094319, filed on Jun. 4, 2020.

(30) Foreign Application Priority Data

Jun. 14, 2019 (CN) .......................... 201910518211.7

(51) Int. Cl.
*H04W 4/46* (2018.01)
*H04W 48/04* (2009.01)
*H04W 76/12* (2018.01)

(52) U.S. Cl.
CPC .............. *H04W 4/46* (2018.02); *H04W 48/04* (2013.01); *H04W 76/12* (2018.02)

(58) Field of Classification Search
CPC ....... H04W 4/46; H04W 48/04; H04W 76/12; H04W 4/02; H04W 4/44; H04W 76/10;
(Continued)

(56) References Cited

U.S. PATENT DOCUMENTS

2015/0244672 A1 8/2015 Singhal
2018/0049088 A1 2/2018 Shiga et al.
(Continued)

FOREIGN PATENT DOCUMENTS

CN 104093124 A 10/2014
CN 106686553 A 5/2017
(Continued)

OTHER PUBLICATIONS

3GPP TS 23.287 V1.0.0 "3rd Generation Partnership Project; Technical Specification Group Services and System Aspects; Architecture enhancements for 5G System (5GS) to support Vehicle-to-Everything (V2X) services(Release 16)," May 2019, 47 pages.
(Continued)

*Primary Examiner* — Charles C Jiang
*Assistant Examiner* — Shawn D Miller
(74) *Attorney, Agent, or Firm* — Conley Rose, P.C.

(57) ABSTRACT

A communication method, apparatus, and system, to implement service data transmission in a server localization scenario, where the method includes: A first network element determining a first address used by a user equipment to send a data packet of a first service to a user plane function network element; and the first network element sending, to the user plane function network element, a correspondence between the first address and address information of a first server that provides the first service, where an address indicated by the address information is used by the user plane function network element to send the data packet to the first server.

20 Claims, 12 Drawing Sheets

(58) Field of Classification Search
CPC . H04L 61/4511; H04L 61/4541; H04L 67/51; H04L 67/563
See application file for complete search history.

(56) References Cited

U.S. PATENT DOCUMENTS

| | | | |
|---|---|---|---|
| 2018/0098251 A1 | 4/2018 | Li et al. | |
| 2019/0124489 A1* | 4/2019 | Ahmad | H04W 28/0268 |
| 2021/0243170 A1* | 8/2021 | Puente Pestaña | H04W 8/18 |

FOREIGN PATENT DOCUMENTS

| | | |
|---|---|---|
| CN | 109275160 A | 1/2019 |
| CN | 109842639 A | 6/2019 |
| EP | 3419351 A1 | 12/2018 |
| WO | 2016202363 A1 | 12/2016 |

OTHER PUBLICATIONS

3GPP TS 23.501 V16.1.0 "3rd Generation Partnership Project; Technical Specification Group Services and System Aspects; System Architecture for the 5G System; Stage 2 (Release 16)," Jun. 2019, 367 pages.

3GPP TS 23.502 V16.1.1 "3rd Generation Partnership Project; Technical Specification Group Services and System Aspects; Procedures for the 5G System; Stage 2 (Release 16)," Jun. 2019, 494 pages.

Huawei, et al., "TS 23.502: Delay time generation for PDU session during handover," SA WG2 Meeting #122bis 62-175844, Aug. 21-25, 2017, Sophia Antipolis, France, 11 pages.

Nokia et al., "Using AF influence mechanism for V2X Application Server discovery," 3GPP TSG-SA WG2 Meeting #133, S2-1905390, May 13-17, 2019, Reno, Nevada, USA, 2 pages.

China Mobile, "Supplement for address resolution and clarification for Localized V2X Application Server discovery and routing," SA WG2 Meeting #133, S2-1905445, Reno, Nevada (USA), May 13-17, 2019, 2 pages.

3GPP TR 33.899 V0.5.0 (S3-161459) "3rd Generation Partnership Project; Technical Specification Group Services and System Aspects; Study on the security aspects of the next generation system (Release 14)," Oct. 2016, 244 pages.

* cited by examiner

COMMUNICATION METHOD, APPARATUS, AND SYSTEM

CROSS-REFERENCE TO RELATED APPLICATIONS

This application is a continuation of International Patent Application No. PCT/CN2020/094319, filed on Jun. 4, 2020, which claims priority to Chinese Patent Application No. 201910518211.7, filed on Jun. 14, 2019. The disclosures of the aforementioned applications are hereby incorporated by reference in their entireties.

TECHNICAL FIELD

Embodiments of this application relate to the communication field, and in particular, to a communication method, apparatus, and system.

BACKGROUND

To enrich functions of a mobile cellular network, support for vehicle-to-everything (V2X) communication is added in the 3rd Generation Partnership Project (3GPP) Release 14. In a 5th generation (5G) mobile communication system, V2X communication may support more vehicle-to-everything application scenarios, for example, vehicle platooning, sensor expansion, remote driving, and autonomous driving enhancement.

In V2X communication, a V2X application server (AS) provides a service for a V2X terminal (a vehicle or a terminal installed in the vehicle). For example, the V2X AS may provide a road ahead congestion alarm for the vehicle or share video information obtained by a surveillance camera on the roadside for the vehicle. In the network architecture shown in FIG. 1, a V2X AS is deployed on a network side, and a V2X terminal accesses a core network through an access network device and then accesses the V2X AS to obtain a service. When moving from a location 1 to a location 2, the V2X terminal accesses the same V2X AS, and an access distance is increased.

To meet a low-latency and high-reliability communication requirement of vehicle-to-everything applications, the V2X AS is localized to shorten a distance between the V2X terminal and the V2X AS, such that a communication latency is reduced. In the network architecture shown in FIG. 2, a V2X AS is deployed locally, and a localized V2X AS usually provides a service for a V2X terminal in a geographic area. In a moving process, a V2X terminal finds a nearest localized V2X AS to obtain a service. As shown in FIG. 2, a V2X terminal moves from a location 1 to a location 2, accesses different V2X ASs, and obtains a service through a nearest localized V2X AS.

In an existing standard, an Internet Protocol (IP) address of a localized V2X AS, an identifier (e.g., application identifier (APP ID)) of a V2X application provided by the V2X AS, and location information of a geographic area in which the V2X AS provides a service are bound to form a correspondence. The correspondence is configured for a V2X terminal through a policy control function (PCF) or using a preconfigured method, such that the V2X terminal can find a localized server that can serve the V2X terminal at a location of the V2X terminal.

However, with the increase of V2X ASs, the increase of types of applications provided by V2X ASs, or the increase of V2X terminals accessing a network in the future, configuration of information about a V2X AS corresponding to each application for all V2X terminals consumes a large quantity of signaling resources and may also expose a location of the V2X AS. This causes a security issue and is very inefficient and complex.

SUMMARY

Embodiments of this application provide a communication method, apparatus, and system, to implement high-efficiency, simple, resource-saving, and high-security service data transmission in a server localization scenario.

To achieve the foregoing objective, the following technical solutions are used in the embodiments of this application.

According to a first aspect, a communication method is provided. The method may include: A first network element determines a first address, where the first address is an address used by user equipment to send a data packet of a first service to a user plane function network element. The first network element sends, to the user plane function network element, a correspondence between the first address and address information of a first server that provides the first service, where an address indicated by the address information of the first server is an address used by the user plane function network element to send the data packet to the first server.

According to the communication method provided in this application, after determining the first address used by the user equipment to send the data packet of the first service, the first network element associates the first address with address information of a server that provides the first service, and sends, to the user plane function network element, a correspondence between the first address and the address information of the server that provides the first service. Therefore, when the server is localized, a first address of each service only needs to be configured. Through conversion of the first address, when receiving a data packet that is sent by the user equipment and whose destination address is a first address of a service, the user plane function network element determines, based on the first address, a server that provides the service for the user equipment, such that server selection is unrelated to the user equipment, and server-related information does not need to be configured for the user equipment. As a result, implementation of a data transmission process is simple, resources are saved, and security is improved.

The first network element may be a session management network element, for example, a session management entity (SMF) network element in a 5G system. Alternatively, the first network element may be a policy control network element, for example, a PCF in a 5G system. Alternatively, the first network element may be a first server, and the first server is any server that provides the first service. The server in this application is also referred to as an application server. For example, the first server may alternatively be a V2X AS, and may also be referred to as an application function (AF).

The service in this application may refer to a service or an application.

With reference to the first aspect, in a possible implementation, the correspondence between the first address and the address information of the first server is used to determine a second server that provides the first service for the user equipment, and the first server includes the second server. The first server is any server that provides the first service, and the second server is any first server.

With reference to any one of the first aspect or the foregoing possible implementation, in another possible implementation, that a first network element determines a first address may be implemented as follows: The first network element allocates the first address based on a service identifier of the first service, to allocate a same first address to a same service identifier.

The service identifier may include a service identifier or an application identifier.

With reference to any one of the first aspect or the foregoing possible implementations, in a possible implementation, the communication method provided in this application may further include: The first network element obtains location information of the first service provided by the first server. The first network element sends the location information to the user plane function network element, where the location information of the first service provided by the first server is used to determine the second server that provides the first service for the user equipment, and the first server includes the second server. A server nearest to the user equipment in terms of a geographic location may be selected based on the location information, to provide a service for the user equipment, or a specific server may be selected based on the location information and a configuration of a localization server, to provide a service for user equipment at a specific location.

It should be noted that the location information described in this application may be location information in a form of coordinates, or may be a geographic identifier (GEO ID) provided by a network side. Specific content of the location information is not specifically limited in this application, and a same type of location information may be used between a plurality of network elements. When different types of location information are used between the plurality of network elements, location information conversion may be performed on a network element. A network element that performs location information conversion is not specifically limited in this application.

With reference to any one of the first aspect or the foregoing possible implementations, in a possible implementation, the communication method provided in this application may further include: The first network element determines the correspondence between the first address and the address information of the first server based on the service identifier of the first service.

With reference to any one of the first aspect or the foregoing possible implementations, in a possible implementation, that the first network element determines the correspondence between the first address and the address information of the first server based on the service identifier of the first service may be implemented as follows: The first network element determines, based on the service identifier of the first service, whether a third address corresponding to the service identifier of the first service exists, where the third address is an address used by the user equipment to send the data packet of the first service to the user plane function network element. If the first network element determines that the third address corresponding to the service identifier of the first service exists, the first network element determines that the first address is the third address, and associates the first address with the address information of the first server to form the correspondence. If the first network element determines that the third address corresponding to the service identifier of the first service does not exist, the first network element allocates the first address, and associates the first address with the address information of the first server to form the correspondence. Because different servers may provide the first service, in this implementation, it is ensured that the same first address is allocated to the same service identifier.

With reference to any one of the first aspect or the foregoing possible implementations, in a possible implementation, the communication method provided in this application may further include: The first network element sends a correspondence between the first address and the service identifier of the first service to the user equipment, such that the user equipment sends the data packet of the first service to the user function network element based on the correspondence using the first address as a destination address when initiating the first service.

With reference to any one of the first aspect or the foregoing possible implementations, in a possible implementation, the first network element is the first server or the policy control network element, and that the first network element sends a correspondence between the first address and the service identifier of the first service to the user equipment may be implemented as follows: The first network element directly sends the correspondence between the first address and the service identifier of the first service to the user equipment.

With reference to any one of the first aspect or the foregoing possible implementations, in a possible implementation, the first network element is the first server, and that the first network element sends a correspondence between the first address and the service identifier of the first service to the user equipment may be implemented as follows: The first server sends the correspondence between the first address and the service identifier of the first service to the user equipment through a policy control network element.

With reference to any one of the first aspect or the foregoing possible implementations, in a possible implementation, the first network element is the session management network element, and that the first network element sends a correspondence between the first address and the service identifier of the first service to the user equipment may be implemented as follows: The session management network element sends the correspondence between the first address and the service identifier of the first service to the user equipment through a policy control network element.

With reference to any one of the first aspect or the foregoing possible implementations, in a possible implementation, the first network element is the first server, and that the first network element sends a correspondence between the first address and the service identifier of the first service to the user equipment may be implemented as follows: The first server directly sends the correspondence between the first address and the service identifier of the first service to the user equipment. For example, the V2X AS may directly send the correspondence between the first address and the service identifier of the first service to a V2X terminal through a V1 interface (dedicated interface between the V2X AS and the V2X terminal).

With reference to any one of the first aspect or the foregoing possible implementations, in a possible implementation, the first network element is the first server, and that the first network element sends a correspondence between the first address and the service identifier of the first service to the user equipment may be implemented as follows: The first server sends the correspondence between the first address and the service identifier of the first service to the user equipment through a policy control network element. For example, the policy control network element may be a PCF network element in the 5G system, and the PCF may send the correspondence between the first address and the service identifier of the first service to the user equipment through parameter configuration information or parameter update information.

That the first network element sends the correspondence between the first address and the service identifier of the first service to the user equipment through a policy control network element may be implemented as follows: The first network element sends the correspondence between the first address and the service identifier of the first service to the policy control network element, and the policy control network element sends the correspondence to the user equipment. Alternatively, the first network element stores the correspondence between the first address and the service identifier of the first service in a unified data repository (UDR) network element (for example, a UDR in the 5G system) or a unified data management (UDM) network element (for example, a UDM in the 5G system) through a network exposure function (NEF) network element (for example, an NEF in the 5G system). The policy control network element obtains the correspondence between the first address and the service identifier of the first service from the unified data repository network element or the unified data management network element, and sends the correspondence to the user equipment.

With reference to any one of the first aspect or the foregoing possible implementations, in another possible implementation, the first network element is the session management network element or the policy control network element, and the communication method provided in this application may further include: The first network element receives the service identifier of the first service and the address information of the first server from the first server.

That the session management network element or the policy control network element receives, from the first server, the service identifier of the first service, the address information of the first server, and the location information of the first service provided by the first server means that the session management network element or the policy control network element receives the service identifier of the first service and the address information of the first server that are directly sent by the first server.

With reference to any one of the first aspect or the foregoing possible implementations, in another possible implementation, the first network element is the session management network element or the policy control network element, and the communication method provided in this application may further include: The first network element obtains the service identifier of the first service and the address information of the first server from the first server through the unified data management network element or the unified data repository network element.

That the first network element obtains the service identifier of the first service and the address information of the first server from the first server through the unified data management network element or the unified data repository network element means that the first server stores the service identifier of the first service and the address information of the first server in the unified data repository network element (for example, the UDR in the 5G system) through the network exposure function network element (for example, the NEF in the 5G system). The session management network element or the policy control network element obtains the service identifier of the first service and the address information of the first server from the unified data repository network element. Alternatively, the first server stores the service identifier of the first service and the address information of the first server in the unified data management network element (for example, the UDM network element in the 5G system) through the network exposure function network element (for example, the NEF in the 5G system). The session management network element or the policy control network element obtains the service identifier of the first service and the address information of the first server from the unified data management network element.

With reference to any one of the first aspect or the foregoing possible implementations, in another possible implementation, the first network element is the first server, and that the first network element sends a correspondence between the first address and address information of a first server to the user plane function network element may be implemented as follows: The first server sends the correspondence between the first address and the address information of the first server to the user plane function network element through a second network element. The second network element is a session management network element, a policy control network element, a unified data repository network element, or a unified data management network element.

When the second network element is the session management network element, that the first server sends the correspondence between the first address and the address information of the first server to the user plane function network element through a second network element includes: The first server sends the correspondence between the first address and the address information of the first server to the session management network element. The session management network element then sends the correspondence between the first address and the address information of the first server to the user plane function network element.

When the second network element is the policy control network element, that the first server sends the correspondence between the first address and the address information of the first server to the user plane function network element through a second network element includes: The first server sends the correspondence between the first address and the address information of the first server to the policy control network element. The policy control network element then sends the correspondence between the first address and the address information of the first server to the user plane function network element through the session management network element.

When the second network element is the unified data repository network element, that the first server sends the correspondence between the first address and the address information of the first server to the user plane function network element through a second network element includes: The first server sends the correspondence between the first address and the address information of the first server to the unified data repository network element. The session management network element or the policy control network element obtains the correspondence between the first address and the address information of the first server from the unified data repository network element. Then, the session management network element or the policy control network element sends the correspondence between the first address and the address information of the first server to the user plane function network element.

When the second network element is the unified data management network element, that the first server sends the correspondence between the first address and the address information of the first server to the user plane function network element through a second network element includes: The first server sends the correspondence between the first address and the address information of the first server to the unified data management network element. The session management network element or the policy control network element obtains the correspondence between the first address and the address information of the first server from the unified data management network element. Then, the session management network element or the policy control network element sends the correspondence between the first address and the address information of the first server to the user plane function network element.

With reference to any one of the first aspect or the foregoing possible implementations, in another possible implementation, the address information of the first server may include an IP address or a fully qualified domain name (FQDN) address. The IP address may be obtained through Domain Name System (DNS) mapping based on the FQDN address.

According to a second aspect, this application provides another communication method. The method may include: A user plane function network element obtains a correspondence between a first address and address information of a first server that provides a first service, where the address information of the first server indicates an address used by the user plane function network element to send a data packet of the first service to the first server, and the first address is an address used by user equipment to send the data packet of the first service to the user plane function network element. The user plane function network element receives a second address from the user equipment, where the second address is the same as the first address. The user plane function network element determines, based on the second address and the correspondence between the first address and the address information of the first server, a second server that provides the first service for the user equipment, where the first server includes the second server.

According to the communication method provided in this application, the user plane function network element may obtain a correspondence between a first address and address information of each server that provides the first service. When the server is localized, a first address of each service only needs to be configured. Through conversion of the first address, when receiving a data packet that is sent by the user equipment and whose destination address is a first address of a service, the user plane function network element determines, based on the first address, a server that provides the service for the user equipment, such that server selection is unrelated to the user equipment, and server-related information does not need to be configured for the user equipment. As a result, implementation of a data transmission process is simple, resources are saved, and security is improved.

With reference to the second aspect, in a possible implementation, that a user plane function network element obtains a correspondence between a first address and address information of a first server may be implemented as follows: The user plane function network element obtains the correspondence between the first address and the address information of the first server from a session management network element, where the correspondence between the first address and the address information of the first server is determined by the session management network element; the correspondence between the first address and the address information of the first server is sent by the first server to a unified data management network element and is obtained by the session management network element from the unified data management network element; or the correspondence between the first address and the address information of the first server is sent by the first server to a unified data repository network element and is obtained by the session management network element from the unified data repository network element.

With reference to the second aspect, in a possible implementation, that a user plane function network element obtains a correspondence between a first address and address information of a first server may be implemented as follows: The user plane function network element obtains the correspondence between the first address and the address information of the first server from a policy control network element through a session management network element, where the correspondence between the first address and the address information of the first server is determined by the policy control network element; the correspondence between the first address and the address information of the first server is sent by the first server to the policy control network element; the correspondence between the first address and the address information of the first server is sent by the first server to a unified data management network element and is obtained by the policy control network element from the unified data management network element; or the correspondence between the first address and the address information of the first server is sent by the first server to a unified data repository network element and is obtained by the policy control network element from the unified data repository network element.

With reference to any one of the second aspect or the foregoing possible implementations, in a possible implementation, the communication method provided in this application may further include: The user plane function network element obtains location information of the first service provided by the first server. The user plane function network element obtains location information of the user equipment accessing a network.

The location information of the first service provided by the first server is used to indicate a geographic area in which the first server provides the first service. The location information of the user equipment accessing the network is used to indicate a current geographic location of the user equipment.

With reference to the second aspect, in a possible implementation, that the user plane function network element obtains location information of the first service provided by the first server may be implemented as follows: The user plane function network element obtains the location information of the first service provided by the first server from the session management network element. The location information of the first service provided by the first server is sent by the first server to the policy control network element and then is sent by the policy control network element to the session management network element; the location information of the first service provided by the first server is sent by the first server to the unified data management network element through a network exposure function network element and is obtained by the session management network element from the unified data management network element; the location information of the first service provided by the first server is sent by the first server to the unified data repository network element through a network exposure function network element and is obtained by the session management network element from the unified data repository network element; the location information of the first service provided by the first server is sent by the first server to the unified data management network element through a network exposure function network element, and the policy control network element obtains the location information from the unified data management network element and sends the location information to the session management network element; or the location information of the first service provided by the first server is sent by the first server to the unified data repository network element through a network exposure function network element, and the policy control network element obtains the location information from the unified data repository network element and sends the location information to the session management network element.

With reference to any one of the second aspect or the foregoing possible implementations, in a possible implementation, that the user plane function network element obtains location information of the user equipment accessing a network may be implemented as follows: The user plane function network element receives, from the user equipment, the location information of the user equipment accessing the network. The user equipment provides the location information of the user equipment, to improve efficiency of obtaining the location information of the user equipment by the user plane function network element.

With reference to any one of the second aspect or the foregoing possible implementations, in a possible implementation, that the user plane function network element obtains location information of the user equipment accessing a network may be implemented as follows: The user plane function network element obtains, from the mobility management network element, the location information of the user equipment accessing the network, to avoid occupying communication resources.

With reference to any one of the second aspect or the foregoing possible implementations, in a possible implementation, the first address and/or the location information of the user equipment accessing the network that are/is obtained by the user plane function from the user equipment may be included in the data packet, of the first service, sent by the user equipment.

With reference to any one of the second aspect or the foregoing possible implementations, in a possible implementation, that the user plane function network element determines, based on the second address and the correspondence between the first address and the address information of the first server, a second server that provides the first service for the user equipment includes: The user plane function network element determines that a location indicated by location information of the first service provided by the second server includes a location indicated by the location information of the user equipment accessing the network. Alternatively, the user plane function network element determines that the location information of the user equipment accessing the network falls within a range indicated by location information of the first service provided by the second server. In this implementation, the user plane function network element selects the second server that provides the first service at a location of the user equipment to provide the first service for the user equipment, such that a server nearest to the user equipment is selected to provide a service, thereby reducing a latency. Alternatively, a specific server provides a service for user equipment at a specific location based on a configuration of a localized server, to meet a specific requirement of local server deployment.

With reference to any one of the second aspect or the foregoing possible implementations, in a possible implementation, if there are a plurality of determined second servers that provide the first service for the user equipment, that the user plane function network element determines, based on the second address and the correspondence between the first address and the address information of the first server, a second server that provides the first service for the user equipment may be implemented as follows: The user plane function network element selects, according to a preset rule, one second server to provide the first service for the user equipment.

With reference to any one of the second aspect or the foregoing possible implementations, in a possible implementation, the preset rule may include: randomly selecting a server, selecting a server with a lowest load rate, or selecting a server in a polling manner.

According to a third aspect, still another communication method is provided. The method may include: User equipment receives a correspondence between a first address and a service identifier of a first service, where the first address is an address used by the user equipment to send a data packet of the first service to a user plane function network element. The user equipment sends the data packet of the first service using the first address as a destination address.

According to the communication method provided in this application, the user equipment obtains the correspondence between the first address and the service identifier of the first service and sends the data packet of the first service using the first address as the destination address when performing the first service, and the user plane function network element selects, based on the first address, a server that provides the first service for the user equipment. Therefore, when the server is localized, a first address of each service only needs to be configured. Through conversion of the first address, the user equipment sends the data packet using the first address as the destination address of the data packet of the first service, and the user plane function network element selects, based on the first address, the server that provides the first service for the user equipment, such that server selection is unrelated to the user equipment, and server-related information does not need to be configured for the user equipment. As a result, implementation of a data transmission process is simple, resources are saved, and security is improved.

With reference to the third aspect, in a possible implementation, that user equipment receives a correspondence between a first address and a service identifier of a first service may be implemented as follows: The user equipment receives the correspondence between the first address and the service identifier of the first service from a policy control network element.

With reference to the third aspect, in a possible implementation, that user equipment receives a correspondence between a first address and a service identifier of a first service may be implemented as follows: The user equipment directly receives the correspondence between the first address and the service identifier of the first service from the server that provides the first service.

According to a fourth aspect, another communication method is provided. The method may include: A first network element determines a first address, where the first address is an address used by user equipment to send a data packet of a first service to a user plane function network element. The first network element sends, to the user plane function network element, a correspondence between the first address and address information of a first server that provides the first service, where an address indicated by the address information of the first application server is an address used by the user plane function network element to send the data packet to the first server. The user plane function network element obtains the correspondence between the first address and the address information of the first server that provides the first service. The user plane function network element receives a second address from the user equipment, where the second address is the same as the first address. The user plane function network element determines, based on the second address and the correspondence between the first address and the address information of the first server, a second server that provides the first service for the user equipment, where the first server includes the second server.

It should be noted that the first aspect, the second aspect, the third aspect, and the fourth aspect describe the technical solutions provided in this application from different perspectives. For implementations thereof, refer to each other. Details are not described again.

According to a fifth aspect, this application provides a communication apparatus. The apparatus may be a first network element, an apparatus or a chip system in the first network element, or an apparatus that can be used with the first network element. The communication apparatus may implement functions performed by the first network element in the foregoing aspects or the possible designs, and the functions may be implemented by hardware, or by hardware executing corresponding software. The hardware or the software includes one or more modules corresponding to the foregoing functions. For example, the communication apparatus may include a determining unit and a sending unit.

The determining unit is configured to determine a first address, where the first address is an address used by user equipment to send a data packet of a first service to a user plane function network element. The sending unit is configured to send, to the user plane function network element, a correspondence between the first address and address information of a first server that provides the first service, where an address indicated by the address information of the first server is an address used by the user plane function network element to send the data packet of the first service to the first server.

It should be noted that the communication apparatus provided in the fifth aspect is configured to perform the communication method provided in the first aspect. For implementations, refer to the implementations of the first aspect.

According to a sixth aspect, this application provides a communication apparatus. The apparatus may be a user plane function network element, an apparatus or a chip system in the user plane function network element, or an apparatus that can be used with the user plane function network element. The communication apparatus may implement functions performed by the user plane function network element in the foregoing aspects or the possible designs, and the functions may be implemented by hardware, or by hardware executing corresponding software. The hardware or the software includes one or more modules corresponding to the foregoing functions. For example, the communication apparatus may include an obtaining unit, a receiving unit, and a determining unit.

The obtaining unit is configured to obtain a correspondence between a first address and address information of a first server that provides a first service, where an address indicated by the address information of the first server is an address used by the user plane function network element to send a data packet of the first service to the first server, where the first address is an address used by user equipment to send the data packet to the user plane function network element. The receiving unit is configured to receive a second address from the user equipment, where the second address is the same as the first address. The determining unit is configured to determine, based on the second address received by the receiving unit and the correspondence obtained by the obtaining unit, a second server that provides the first service for the user equipment, where the first server includes the second server.

It should be noted that the communication apparatus provided in the sixth aspect is configured to perform the communication method provided in the second aspect. For implementations, refer to the implementations of the second aspect.

According to a seventh aspect, this application provides a communication apparatus. The apparatus may be user equipment, an apparatus in the user equipment, or an apparatus that can be used with the user equipment. The communication apparatus may implement functions performed by the user equipment in the foregoing aspects or the possible designs, and the functions may be implemented by hardware, or by hardware executing corresponding software. The hardware or the software includes one or more modules corresponding to the foregoing functions. For example, the communication apparatus may include a receiving unit and a sending unit.

The receiving unit is configured to receive a correspondence between a first address and a service identifier of a first service, and the first address is an address used by the user equipment to send a data packet of the first service to a user plane function network element. The sending unit is configured to send the data packet of the first service using the first address as a destination address.

It should be noted that the communication apparatus provided in the seventh aspect is configured to perform the communication method provided in the third aspect. For implementations, refer to the implementations of the third aspect.

According to an eighth aspect, an embodiment of this application provides another communication apparatus. The apparatus includes a processor configured to implement the communication method described in the first aspect. The apparatus may further include a memory. The memory is coupled to the processor. When executing instructions stored in the memory, the processor may implement the communication method described in the first aspect. The apparatus may further include a communication interface. The communication interface is used by the apparatus to communicate with another device. For example, the communication interface may be a transceiver, a circuit, a bus, a module, or a communication interface of another type. In a possible implementation, the apparatus includes: a memory configured to store instructions; and a processor configured to: determine a first address, where the first address is an address used by user equipment to send a data packet of a first service to a user plane function network element; and send, to the user plane function network element through the communication interface, a correspondence between the first address and address information of a first server that provides the first service, where an address indicated by the address information of the first application server is an address used by the user plane function network element to send the data packet to the first server.

It should be noted that the instructions in the memory in this application may be pre-stored, or may be downloaded from the Internet and then stored when the apparatus is used. Sources of the instructions in the memory are not specifically limited in this application. The coupling in this embodiment of this application is indirect coupling or a connection between apparatuses, units, or modules for information exchange between the apparatuses, the units, or the modules, and may be in electrical, mechanical, or other forms.

According to a ninth aspect, an embodiment of this application provides another communication apparatus. The apparatus includes a processor configured to implement the communication method described in the second aspect. The apparatus may further include a memory. The memory is coupled to the processor. When executing instructions stored in the memory, the processor may implement the communication method described in the second aspect. The apparatus may further include a communication interface. The communication interface is used by the apparatus to communicate with another device. For example, the communication interface may be a transceiver, a circuit, a bus, a module, or a communication interface of another type. In a possible implementation, the apparatus includes: a memory configured to store instructions; and a processor configured to: obtain a correspondence between a first address and address information of a first server that provides a first service, where the address information of the first server indicates an address used by a user plane function network element to send a data packet of the first service to the first server, and the first address is an address used by user equipment to send the data packet of the first service to the user plane function network element; receive a second address from the user equipment through the communication interface, where the second address is the same as the first address; and determine, based on the second address and the correspondence between the first address and the address information of the first server, a second server that provides the first service for the user equipment, where the first server includes the second server.

According to a tenth aspect, an embodiment of this application provides another communication apparatus. The apparatus includes a processor configured to implement the communication method described in the third aspect. The apparatus may further include a memory. The memory is coupled to the processor. When executing instructions stored in the memory, the processor may implement the communication method described in the third aspect. The apparatus may further include a communication interface. The communication interface is used by the apparatus to communicate with another device. For example, the communication interface may be a transceiver, a circuit, a bus, a module, or a communication interface of another type. In a possible implementation, the apparatus includes: a memory configured to store instructions; and a processor configured to: receive a correspondence between a first address and a service identifier of a first service through the communication interface, and the first address is an address used by user equipment to send a data packet of the first service to the user plane function network element; and send the data packet of the first service through the communication interface using the first address as a destination address.

According to an eleventh aspect, an embodiment of this application further provides a computer-readable storage medium, including instructions. When the instructions are run on a computer, the computer is enabled to perform the communication method in any one of the foregoing aspects or the possible implementations.

According to a twelfth aspect, an embodiment of this application further provides a computer program product. When the computer program product runs on a computer, the computer is enabled to perform the communication method in any one of the foregoing aspects or the possible implementations.

According to a thirteenth aspect, an embodiment of this application provides a chip system. The chip system includes a processor, may further include a memory, and is configured to implement functions of the core network device in the foregoing methods. The chip system may include a chip, or may include a chip and another discrete component.

According to a fourteenth aspect, an embodiment of this application provides a chip system. The chip system includes a processor, may further include a memory, and is configured to implement functions of the first network element, the user plane function network element, or the user equipment in the foregoing methods. The chip system may include a chip, or may include a chip and another discrete component.

According to a fifteenth aspect, a communication system is provided. The communication system includes a first communication apparatus, a second communication apparatus, and a third communication apparatus. The first communication apparatus may implement the method in any one of the first aspect or the possible implementations of the first aspect. The second communication apparatus may implement the method in any one of the second aspect or the possible implementations of the second aspect. The third communication apparatus may implement the method in any one of the third aspect or the possible implementations of the third aspect. For example, the first communication apparatus is a first network element, the second communication apparatus is a user plane function network element, and the third communication apparatus is user equipment.

According to a sixteenth aspect, a communication system is provided. The communication system includes a first network element and a user plane function network element. The first network element is configured to: determine a first address, where the first address is an address used by user equipment to send a data packet of a first service to the user plane function network element; and send, to the user plane function network element, a correspondence between the first address and address information of a first server that provides the first service, where an address indicated by the address information is an address used by the user plane function network element to send the data packet of the first service to the first server. The user plane function network element is configured to: obtain the correspondence between the first address and the address information of the first server that provides the first service; receive a second address from the user equipment, where the second address is the same as the first address; and determine, based on the second address and the correspondence, a second server that provides the first service for the user equipment, where the first server includes the second server.

With reference to the sixteenth aspect, in a possible implementation, the communication system may further include the user equipment configured to: receive a correspondence between the first address and a service identifier of the first service, where the first address is an address used by the user equipment to send the data packet of the first service to the user plane function network element; and send the data packet of the first service to the user plane function network element using the first address as a destination address.

The solutions provided in the fifth aspect to the sixteenth aspect are used to implement the communication methods provided in the first aspect to the third aspect. Therefore, the solutions can achieve same beneficial effects as those in the first aspect to the third aspect. Details are not described herein again.

DESCRIPTION OF EMBODIMENTS

Figure 1:
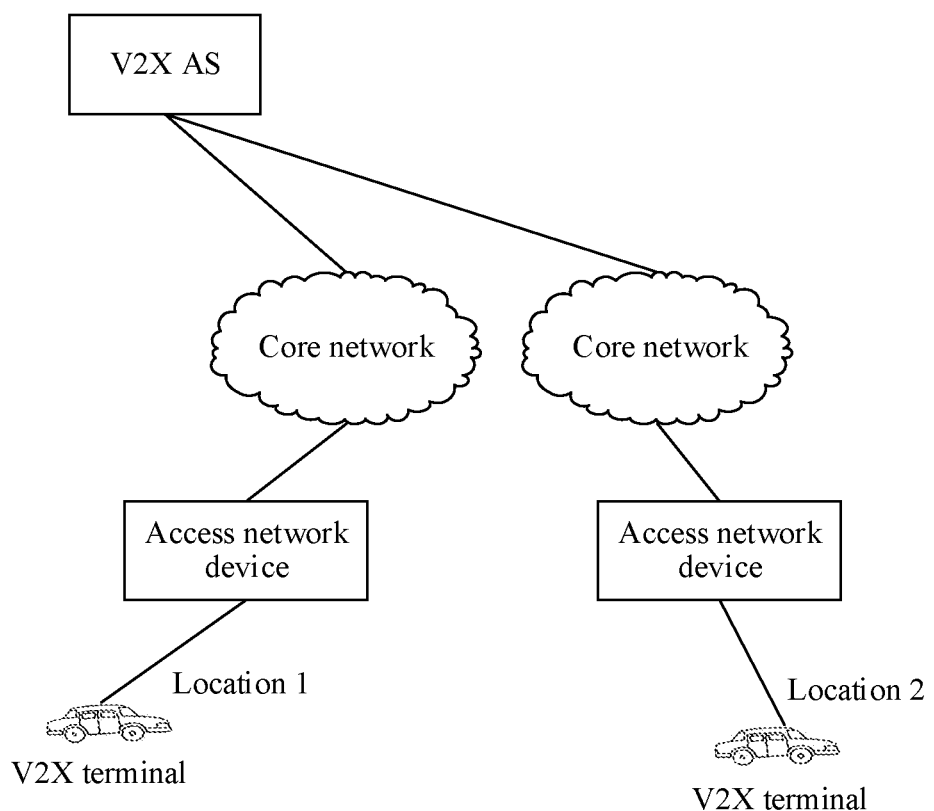
FIG. 1 is a schematic diagram of a network architecture in a conventional technology.
Figure 2:
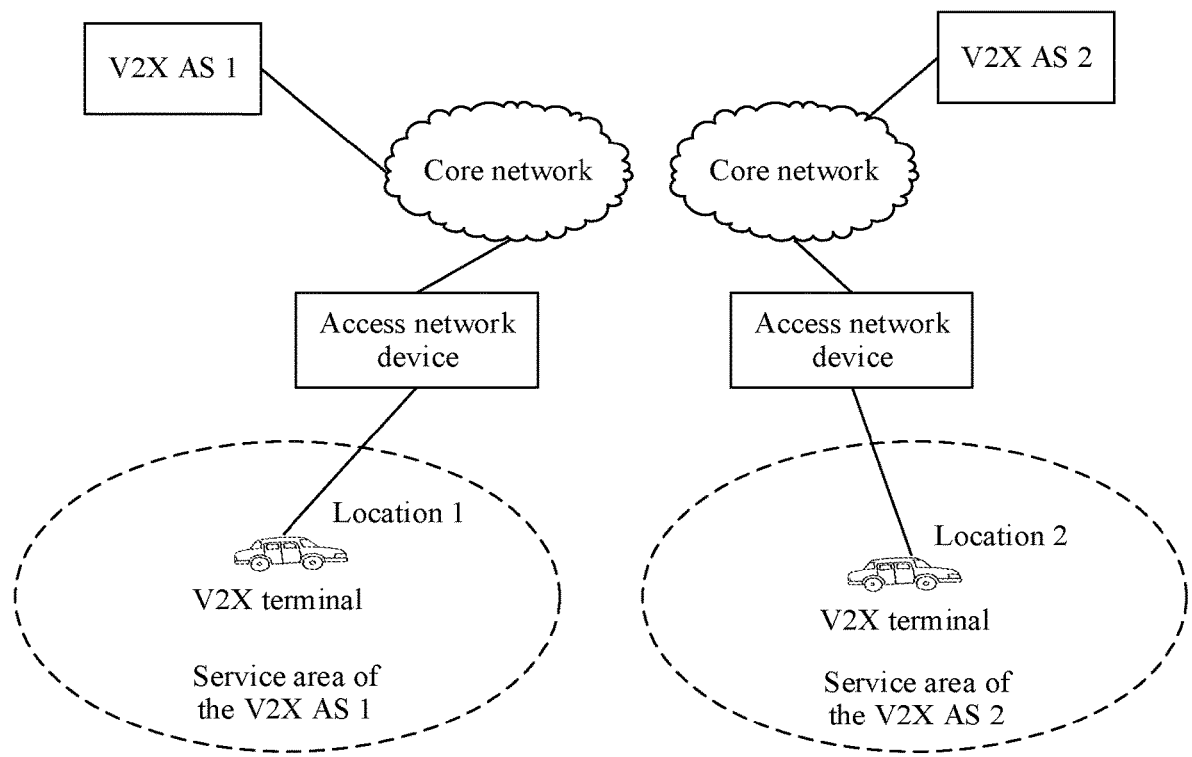
FIG. 2 is a schematic diagram of another network architecture in a conventional technology.

In embodiments of this application, to clearly describe the technical solutions in the embodiments of this application, words such as "first" and "second" are used to distinguish between same items or similar items whose functions are basically the same. A person skilled in the art may understand that the words such as "first" and "second" do not limit a quantity or an execution sequence, and the words such as "first" and "second" do not indicate a definite difference. There is no chronological order or no size order between the technical features described by the "first" and the "second".

In the embodiments of this application, the word "example" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the word "example", "for example", or the like is intended to present a relative concept in a specific manner for ease of understanding.

In the descriptions of this application, "/" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one item (piece) of the following" or a similar expression thereof means any combination of these items, including any combination of singular items (pieces) or plural items (pieces). For example, at least one (piece) of a, b, or c may represent: a, b, c; a and b; a and c; b and c; or a, b, and c; where a, b, and c may be singular or plural.

In the embodiments of this application, "at least one" may also be "one or more", and "a plurality of" may be two, three, four, or more. This is not limited in this application.

It should be noted that in this application, A sends content to B. When A and B are not directly connected in a network architecture, the content may be forwarded level by level through a network element between A and B, such that the content reaches B. In this specification, it indicates that "A sends the content to B".

In addition, a network architecture and a scenario described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and the emergence of new service scenarios, the technical solutions provided in the embodiments of this application are also applicable to similar technical problems.

Before the embodiments of this application are described, nouns in this application are explained and described herein. Details are not described one by one in the following.

A server refers to a device that provides a service for user equipment. The user equipment accesses a core network through an access network device, and then accesses data of a data network (DN) through the server.

A service refers to a service or an application. For example, instant messaging software is an application, and an instant messaging software application may include one or more services, for example, a video service and an information service.

A service identifier refers to a service identifier or an application identifier.

An address refers to a direction identifier used to send a data packet to a network element. Any address described in this application may be an IP address or an FQDN address. The FQDN address and the IP address are mapped to each other in a DNS and can be converted to each other.

A method provided in the embodiments of this application may be used in any communication system for server localization. The communication system may be a 3GPP communication system, for example, a Long-Term Evolution (LTE) system, a 5G mobile communication system, or a new radio (NR) system; or the communication system may be a non-3GPP communication system. This is not limited. The server described in this application may also be referred to as a server, and may be a server that provides a V2X service, or may be a server that provides another type of service. This is not specifically limited in the embodiments of this application.

Figure 3:
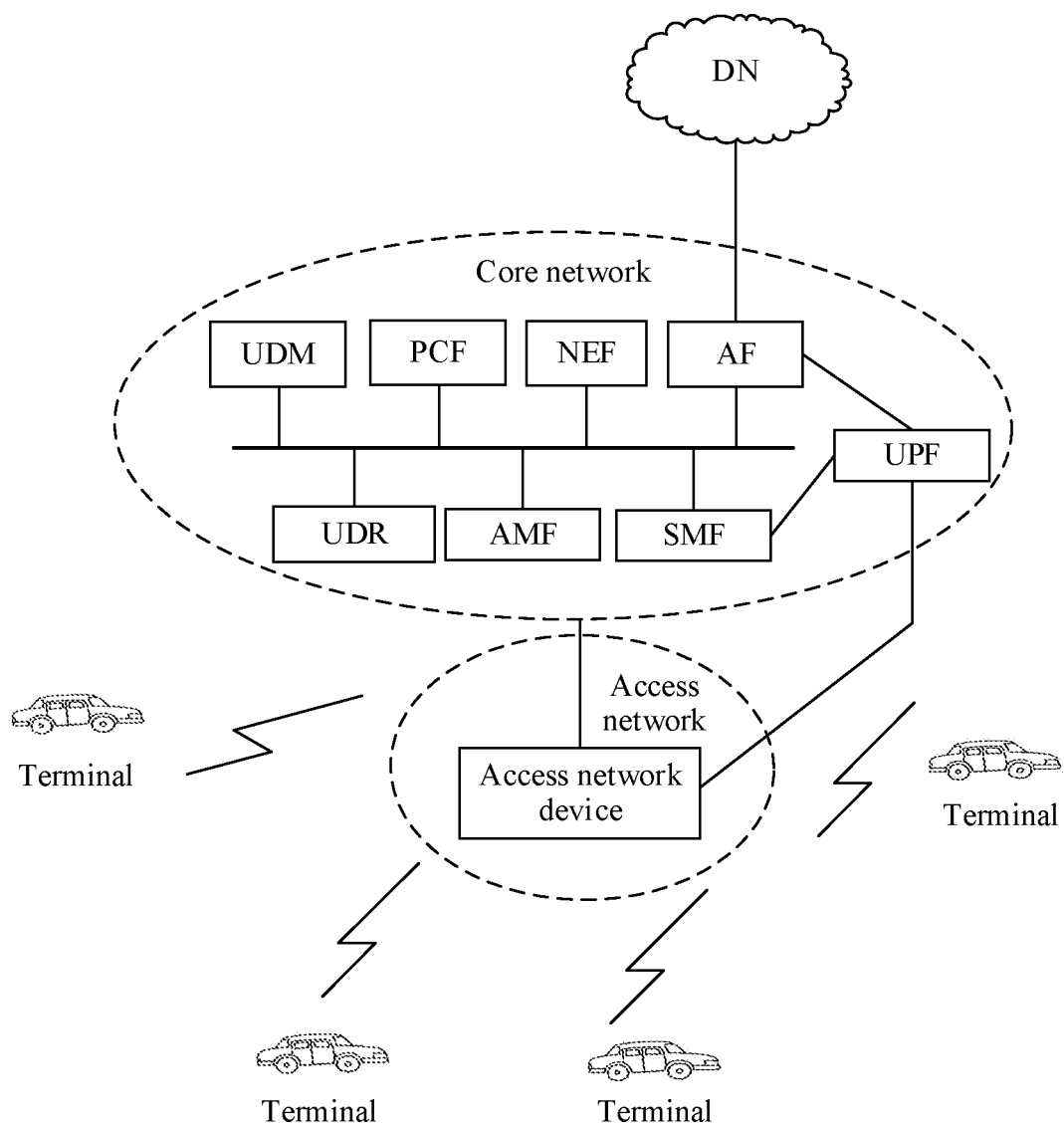
FIG. 3 is a schematic diagram of an architecture of a communication system according to an embodiment of this application.

As shown in FIG. 3, a diagram of an architecture of a communication system is provided. The communication system may include a user equipment (UE) or a plurality of UEs, an access network, a core network, a data network (DN), and the like. In FIG. 3, an example in which the core network and the access network are 5G networks is used for description. Refer to FIG. 3. A core network device may include an access and mobility management function (AMF), a PCF, a UDM, a UDR, an SMF, a UPF, an NEF, and an AF. The following describes network element in this application with reference to FIG. 3.

The UE may be referred to as a terminal device (terminal), and the terminal may support V2X communication or another service. For example, the user equipment supports receiving or sending of a V2X message. In this case, the terminal may also be referred to as a V2X terminal. The V2X message may include but is not limited to a vehicle-to-vehicle (V2V) message, a vehicle-to-pedestrian (V2P) message, a vehicle-to-network (V2N) message, vehicle-to-infrastructure (V2I) information, an anti-collision message exchanged between vehicles, an entertainment application message, a navigation message exchanged between vehicles, and the like. It is clear that the terminal shown in FIG. 3 may include but is not limited to a vehicle-mounted terminal, a mobile phone, a tablet computer or a computer having a wireless transceiver function, a smart gas station, an intelligent traffic light, and the like.

An access network device is responsible for radio resource management, uplink and downlink data classification, a quality of service (QoS) application, functions of completing signaling processing with a control plane network element and completing data forwarding with a user plane function network element, and the like. For example, the access network device may be a base station, a broadband network gateway (BNG), an aggregation switch, a non-3GPP access device, or the like. The base station may include base stations in various forms, for example, a macro base station, a micro base station (also referred to as a small cell), a relay station, or an access point. This is not specifically limited in the embodiments of this application. A device through which the terminal accesses the core network is referred to as the access network device in this specification, and details are not described herein. For example, the access network device may be an evolved universal terrestrial radio access network (E-UTRAN) device in a 4$^{th}$ generation (4G) network, a next generation radio access network (NG-RAN) device in a 5G network, or the like.

Main functions of the AMF include a termination point of a radio access network control plane, a termination point of non-access signaling, mobility management, lawful interception, access authorization/authentication, and the like.

The UPF is configured to: route and forward a data packet, perform QoS control on user plane data, collect statistics on charging information, and the like.

The SMF is used for session management, IP address allocation and management of the terminal, selection and management of a user plane function, a termination point of a policy control and charging function interface, downlink data notification, and the like.

The PCF is configured to: manage a network behavior, and provide a parameter related to a UE policy for the terminal, a parameter related to an access and mobility (AM) policy for the AMF, and a parameter related to a session management (SM) policy for the SMF. In a V2X scenario, the PCF provides information such as V2X-related authentication and policy parameters for the terminal and the access network device.

The UDM is configured to: manage subscription information, provide the subscription information for a related network element, and the like.

The UDR is configured to: store and retrieve a PCF policy, store and retrieve structured data for exposure, store user information requested by the application function, and the like.

The NEF connects a core network element to an external server and provides services such as authentication and data forwarding when the external server initiates a service request to the core network.

The AF is a server corresponding to an application, that is, a localized server. A V2X AS is an AF.

The DN is a network, for example, an Internet network, used to transmit data.

It should be noted that a network consisting of operator network elements other than a RAN may be referred to as a core network. In the 4G network, the core network includes network elements such as a mobility management entity (MME), a serving gateway (S-GW), a packet data network gateway (P-GW), and a home subscriber server (HSS). In the 5G network, the core network includes network elements such as the AMF, the SMF, the UPF, the UDM, and the PCF. In FIG. 3, the 5G network is merely used as an example, and the core network element is not specifically limited.

It should be noted that a network architecture that the embodiments of this application use is not limited to the network architecture shown in FIG. 3. In addition, the network architecture shown in FIG. 3 is merely a diagram of an example architecture, and a quantity of network elements included in the communication system, types of the network elements, and names of the network elements are not limited. The network element in the embodiments of this application may also be referred to as a device or an entity. For example, in addition to the network elements shown in FIG. 3, the network shown in FIG. 3 may further include another functional entity. For another example, the network elements in the architecture in FIG. 3 and names of the network elements are merely examples. During implementation, the network elements and a protocol layer may have other names. This is not specifically limited in the embodiments of this application.

A basic principle of the solutions provided in this application is as follows: With reference to a communication mechanism of anycast communication, in a server localization scenario, a dedicated address is separately configured for different services, and is used by the UE sends a data packet of a service to the network. A correspondence between a dedicated address and a service identifier is configured for the UE, and a correspondence between a dedicated address and address information of a server is configured for a network side. In this way, the UE does not need to learn of a specific server that provides a service for the UE, and therefore server-related information does not need to be configured for the UE. This simplifies implementation, saves resources, and improves security.

The following describes implementations of the embodiments of this application in detail with reference to the accompanying drawings. It should be noted that in the following embodiments of this application, names of messages between network elements, names of parameters in messages, or the like are merely examples, and may be other names during implementation. This is not specifically limited in the embodiments of this application.

Figure 4:
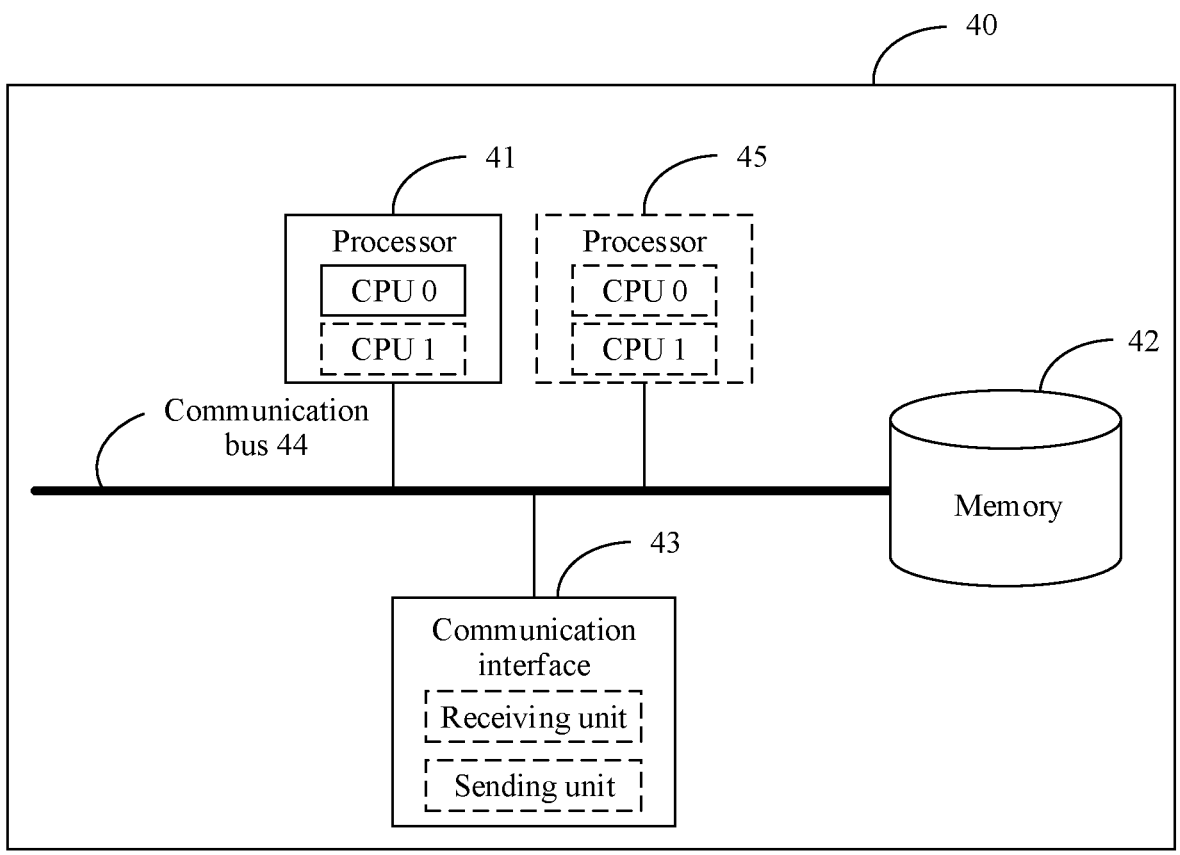
FIG. 4 is a schematic diagram of a structure of a communication apparatus according to an embodiment of this application.

FIG. 4 is a schematic composition diagram of a communication apparatus 40 according to an embodiment of this application. As shown in FIG. 4, the communication apparatus 40 may include at least one processor 41, a memory 42, a communication interface 43, and a communication bus 44.

The following describes components of the communication apparatus 40 in detail with reference to FIG. 4.

The processor 41 may be one processor, or may be a collective name of a plurality of processing elements. For example, the processor 41 may be a central processing unit (CPU) or an application specific integrated circuit (ASIC), or may be one or more integrated circuits, for example, one or more microprocessors or one or more field programmable gate arrays (FPGAs) configured to implement the embodiments of this application.

The processor 41 may perform various functions of a function alias control server by running or executing a software program stored in the memory 42 and invoking data stored in the memory 42. During implementation, in an embodiment, the processor 41 may include one or more CPUs, for example, a CPU 0 and a CPU 1 shown in FIG. 4.

During implementation, in an embodiment, the communication apparatus 40 may include a plurality of processors, for example, the processor 41 and a processor 45 shown in FIG. 4. Each of these processors may be a single-core processor (single-CPU), or may be a multi-core processor (multi-CPU). The processor herein may be one or more devices, circuits, and/or processing cores configured to process data (for example, computer program instructions).

The memory 42 may be a read-only memory (ROM) or another type of static storage device that can store static information and instructions, or a random access memory (RAM) or another type of dynamic storage device that can store information and instructions. The memory 42 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible by a computer, but is not limited thereto. The memory 42 may exist independently, and is connected to the processor 41 through the communication bus 44. The memory 42 may alternatively be integrated with the processor 41. The memory 42 is configured to store a software program for performing the solutions of this application, and the processor 41 controls the execution.

The communication interface 43 is configured to communicate with another device or a communication network such as the Ethernet, a radio access network (RAN), or a wireless local area network (WLAN) using any apparatus such as a transceiver. The communication interface 43 may include a receiving unit and a sending unit.

The communication bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

It should be noted that the components shown in FIG. 4 do not constitute a limitation on the communication apparatus. In addition to the components shown in FIG. 4, the communication apparatus may include more or fewer components than those shown in the figure, or some components may be combined, or different component arrangements may be used.

In a possible implementation, the processor 41 runs or executes the software program and/or a module stored in the memory 42, and invokes data stored in the memory 42, to perform the following functions: determining a first address, where the first address is an address used by user equipment to send a data packet of a first service to a user plane function network element; and sending, to the user plane function network element through the communication interface 43, a correspondence between the first address and address information of a first server that provides the first service, where an address indicated by the address information of the first server is an address used by the user plane function network element to send the data packet of the first service to the first server.

In another possible implementation, the processor 41 runs or executes the software program and/or a module stored in the memory 42, and invokes data stored in the memory 42, to perform the following functions: obtaining a correspondence between a first address and address information of a first server, where an address indicated by the address information of the first server is an address used by a user plane function network element to send a data packet of a first service to the first server, and the first address is an address used by user equipment to send the data packet of the first service to the user plane function network element; receiving a second address from the user equipment through the communication interface 43, where the second address is the same as the first address; and determining, based on the second address and the correspondence between the first address and the address information of the first server, a second server that provides the first service for the user equipment, where the first server includes the second server.

In still another possible implementation, the processor 41 runs or executes the software program and/or a module stored in the memory 42, and invokes data stored in the memory 42, to perform the following functions: receiving a correspondence between a first address and a service identifier of a first service through the communication interface 43, where the first address is an address used to send a data packet of the first service to a user plane function network element; and sending the data packet of the first service through the communication interface 43 using the first address as a destination address.

Figure 5:
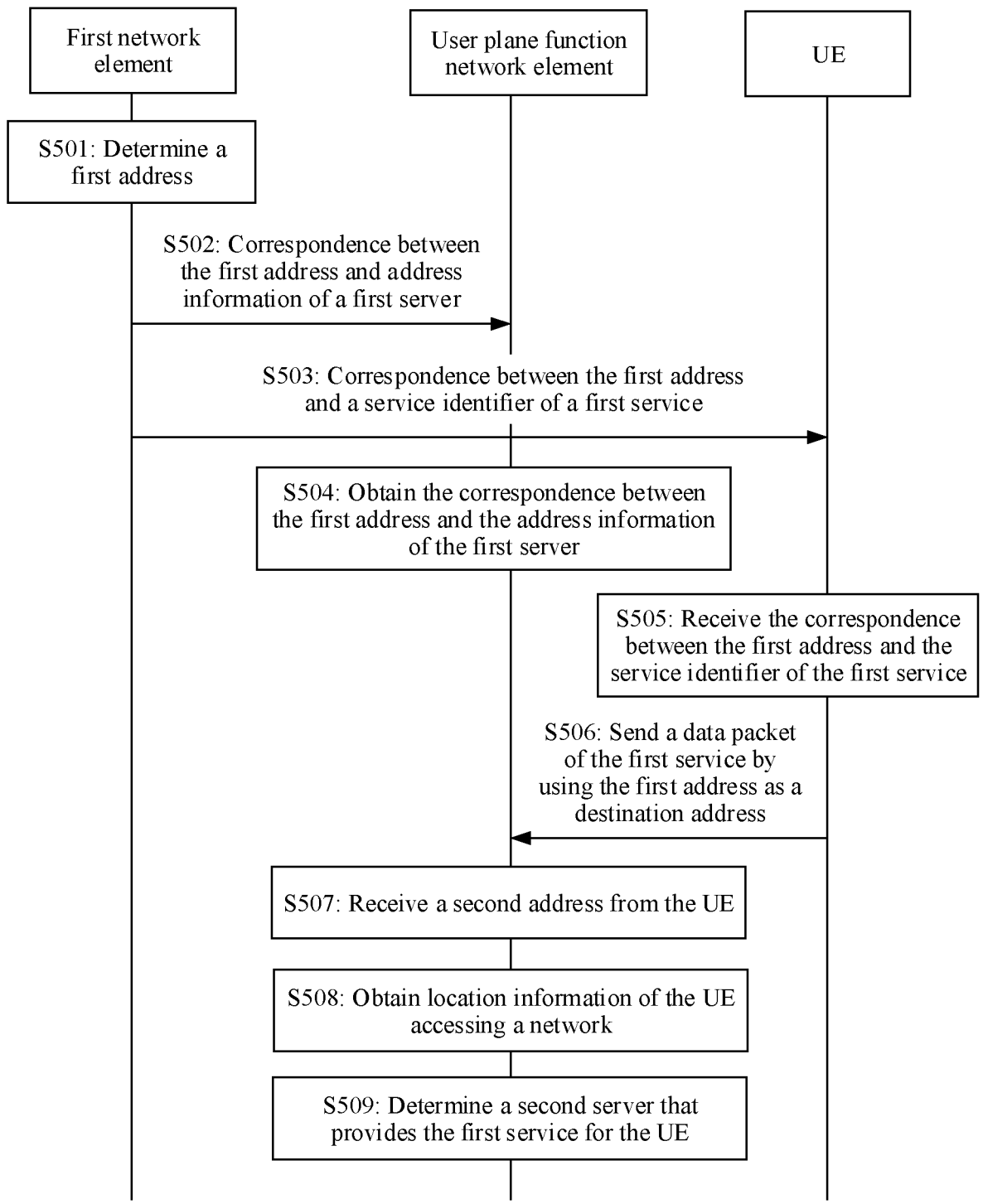
FIG. 5 is a flowchart of a communication method according to an embodiment of this application.

According to one aspect, an embodiment of this application provides a communication method, applied to a process of interaction between a network element on a network side and UE, such that a localized server provides a low-latency first service in a moving process of the UE. FIG. 5 is a flowchart of a communication method according to an embodiment of this application. As shown in FIG. 5, the method may include the following steps.

S501: A first network element determines a first address.

The first address is an address used by a UE to send a data packet of a first service to a user plane function network element. The first address is an address that is configured by the first network element for the first service and used by the UE to send the data packet of the first service to the user plane function network element. For example, when accessing the first service, the UE sends the data packet of the first service using the first address as a destination address, and when one or more servers in localized servers provide the first service for the UE, a network side selects one server from the one or more servers that provide the first service to provide the first service for the UE.

Optionally, the first address may be in a form of an IP address or a form of an FQDN address. This is not specifically limited in this embodiment of this application.

The first service is any service supported by the UE. For example, the first service may be any one of V2X services or another service. This is not specifically limited in this embodiment of this application.

For example, that a first network element determines a first address in S501 may be implemented as follows: The first network element allocates the first address based on a service identifier of the first service.

Optionally, in S501, the first network element may determine the first address of the first service using, but not limited to, the following two solutions.

Solution 1: If the first network element determines that a third address corresponding to the service identifier of the first service exists, where the third address is an address used by the UE to send the data packet of the first service to the user plane function network element, the first network element determines that the first address is the third address. If the first network element determines that a third address corresponding to the service identifier of the first service does not exist, the first network element allocates the first address.

In the solution 1, the first network element first determines whether the third address corresponding to the service identifier of the first service exists, that is, determines whether the address used by the UE to send the data packet of the first service to the user plane function network element has been allocated. If the address has been allocated, the allocated address used by the UE to send the data packet of the first service to the user plane function network element is used as the first address. If the address is not allocated, the first network element allocates the first address, to ensure that the first address of the first service allocated to each server is the same.

A second address corresponding to the service identifier of the first service may be an address previously allocated by the first network element, or may be an address that is allocated by another first network element and used by the UE to send the data packet of the first service to the user plane function network element. This is not specifically limited in this embodiment of this application.

Optionally, after the first network element allocates the first address, the method provided in this embodiment of this application may further include: The current first network element synchronizes the first address of the first service to the other first network element, such that the other first network element determines whether the second address corresponding to the service identifier of the first service exists when performing S501.

In a possible implementation, the first network element may randomly allocate the first address, and a specific random allocation algorithm may be selected based on an actual requirement. This is not specifically limited in this embodiment of this application. For example, the random allocation algorithm may be a hash algorithm.

In another possible implementation, the first network element calculates content of the first address according to a preset expression. The content of the preset expression may be configured based on an actual requirement. This is not specifically limited in this embodiment of this application.

Solution 2: A first address used by the UE to send a data packet of each service is preconfigured on the first network element, and the first network element queries preconfigured content to obtain the first address corresponding to the service identifier of the first service.

A type of the first network element may be selected based on an actual requirement. Any network element that can configure the first address may be used as the first network element. The type of the first network element is not specifically limited in this embodiment of this application. The following schematically describes three possible types of the first network element, but is not limited thereto.

Type 1: The first network element may be a session management network element, for example, an SMF network element in a 5G system.

Type 2: The first network element may be a policy control network element, for example, a PCF network element in the 5G system.

Type 3: The first network element may be a first server, and the first server is any server that provides the first service. For example, the first server may be a V2X AS. The first server may perform the process of S501 when initiating service creation of the first service or modifying or deleting a service request of an existing first service.

For example, when the first network element is the first server, address information of the first server and the like may be directly read and obtained.

Optionally, when the first network element is the session management network element or the policy control network element, before S501, the communication method provided in this embodiment of this application may further include S501a and S501b, such that the first network element obtains the service identifier of the first service and the address information of the first server.

S501a: The first server sends the service identifier of the first service and the address information of the first server to the first network element.

For each first server, an operation of the first server and a process of communication between another network element and the first server are the same as each other. This specification describes only an example operation of one first server and a process of communication between a network element and the first server, and others are not described in detail.

The service identifier of the first service is used to uniquely indicate the first service, and the service identifier of the first service may be a character string, an Arabic numeral, or others. A type and content of the service identifier of the first service are not specifically limited in this embodiment of this application. For example, the service identifier of the first service may be any one of the following identifiers: a data network name (DNN), single network slice selection assistance information (S-NSSAI), an application function service identifier (AF-service-identifier), a data network access identifier (DNAI), or an application identifier (APP ID).

The address information of the first server is used by the user plane function network element to send the data packet of the first service to the first server. The address information of the first server may include an IP address or an FQDN address.

Optionally, in S501a, the first server may further send, to the first network element, location information of the first service provided by the first server, where the location information is used to indicate a geographic area in which the first server provides the first service, and the location information may be coordinate information or may be a GEO ID. This is not specifically limited in this embodiment of this application.

For example, if the first service provided by the first server is not limited to a geographic service range, the first server does not send, to the first network element, the location information of the first service provided by the first server. If the first service provided by the first server is limited to a geographic service range, the first server sends, to the first network element, the location information of the first service provided by the first server.

It should be noted that the location information that is sent by the first server to the first network element and the service identifier of the first service and the address information of the first server that are sent by the first server to the first network element may be sent in one message, or may be sent separately. This is not specifically limited in this embodiment of this application.

It should be noted that the first server may perform S501a when initiating service creation of the first service or modifying or deleting the service request of the existing first service. The first server usually needs to send a request message when initiating service creation of the first service or modifying or deleting the service request of the existing first service. The service identifier of the first service and the address information of the first server that are sent by the first server to the first network element in S501a (where optionally, the location information of the first service provided by the first server is further included) may be carried in the request message for sending, or the service identifier of the first service and the address information of the first server that are sent by the first server to the first network element in S501a (where optionally, the location information of the first service provided by the first server is further included) may be sent separately in one message. This is not specifically limited in this embodiment of this application.

For example, the request message sent when the first server initiates service creation of the first service or modifies or deletes the service request of the existing first service may be as follows: The request message may be a traffic influence creation message (such as an Nnef_TrafficInfluence_Create message), a traffic influence update message (such as an Nnef_TrafficInfluence_Update message), a traffic influence deletion message (such as an Nnef_TrafficInfluence_Delete message), a parameter provision creation message (such as an Nnef_ParameterProvision_Create message), a parameter provision update message (such as an Nnef_ParameterProvision_Update message), or a parameter provision deletion message (such as an Nnef_ParameterProvision_Delete message). The descriptions herein are merely an example, and do not constitute a limitation.

For example, S501a relates to a case in which the first network element is the session management network element or the policy control network element. In this embodiment of this application, there may be a plurality of cases in which the first server sends information to the session management network element or the policy control network element. Descriptions are provided herein. Details are not described again subsequently.

For example, in an implementation of this application, a process in which the first server sends the information to the policy control network element may include but is not limited to the following two cases.

Case 1: The first server may directly send the information to the policy control network element.

In the case 1, the policy control network element may perform authorization control on the first server, and perform a subsequent process after authorization succeeds.

For example, that the policy control network element performs authorization control on the first server may be implemented as follows: The policy control network element searches, based on a source IP of the request message sent by the first server or an identifier of the first server, a list of servers that can provide a service or a similar database, and determines whether the policy control network element can provide a corresponding service for the server.

Case 2: The first server sends the information to a network exposure function network element, the network exposure function network element sends the information to a unified data repository network element or a unified data management network element, and the policy control network element obtains the information from the unified data repository network element or the unified data management network element.

The network exposure function network element may be a NEF network element, the unified data repository network element may be a UDR, and the unified data management network element may be a UDM.

In the case 2, the network exposure function network element may perform authorization control on the first server, and perform a subsequent process after authorization succeeds.

It should be noted that a process in which the network exposure function network element performs authorization control is the same as the foregoing process in which the policy control network element performs authorization control, and details are not described herein again.

For example, in an implementation of this application, a process in which the first server sends the information to the session management network element may include but is not limited to the following two cases: The first server may directly send the information to the session management network element. Alternatively, the first server sends the information to the network exposure function network element, the network exposure function network element sends the information to the unified data repository network element or the unified data management network element, and the session management network element obtains the information from the unified data repository network element or the unified data management network element. For the implementation thereof, refer to the foregoing two cases in which the first server sends the information to the policy control network element. Details are not described herein again.

In the foregoing different manners in which the first server sends the information to the policy control network element/the session management network element, when the first network element is the policy control network element/the session management network element, S501a in this embodiment of this application may be implemented as follows.

The first server may directly send the service identifier of the first service and the address information of the first server (where optionally, the location information of the first service provided by the first server is further included) to the first network element. Alternatively, the first server sends the service identifier of the first service and the address information of the first server (where optionally, the location information of the first service provided by the first server is further included) to the network exposure function network element, the network exposure function network element sends the information to the unified data repository network element or the unified data management network element, and the first network element obtains the service identifier of the first service and the address information of the first server from the unified data repository network element or the unified data management network element (where optionally, the location information of the first service provided by the first server is further included). For the implementation thereof, refer to the foregoing two cases in which the first server sends the information to the policy control network element. Details are not described herein again.

S501b: The first network element receives the service identifier of the first service and the address information of the first server from the first server.

Optionally, corresponding to S501a, in S501b, the first network element may further receive, from the first server, the location information of the first service provided by the first server.

In a possible implementation, corresponding to the implementation of S501a in this embodiment of this application, S501b may be implemented as follows: The first network element receives the service identifier of the first service and the address information of the first server (where optionally, the location information of the first service provided by the first server is further included) from the first server. This implementation corresponds to the case 1 in S501a. For details, refer to the implementation thereof. Details are not described again.

In a possible implementation, corresponding to the implementation of S501a in this embodiment of this application, S501b may be implemented as follows: The first network element obtains the service identifier of the first service and the address information of the first server (where optionally, the location information of the first service provided by the first server is further included) from the first server through the unified data management network element or the unified data repository network element. This implementation corresponds to the case 2 in S501a. For details, refer to the implementation thereof. Details are not described again.

S502: The first network element sends a correspondence between the first address and the address information of the first server to the user plane function network element.

The user plane function network element may be a UPF network element in the 5G system.

For example, S502 may be implemented as follows: The first network element determines the correspondence between the first address and the address information of the first server based on the service identifier of the first service. The correspondence between the first address and the address information of the first server is used to determine a second server that provides the first service for the user equipment, and the first server includes the second server. It should be understood that the first server is a server that provides the first service, and the second server is one or more of first servers.

For example, in S502, the first network element binds the address information of the first server and the first address to form the correspondence. The binding described in this specification may be understood as establishing a correlation relationship, and details are not described subsequently again.

Optionally, when the first network element further obtains the location information of the first service provided by the first server in S501, correspondingly, in S502, the first network element may further send, to the user plane function network element, the location information of the first service provided by the first server, and the second server that provides the first service for the user equipment is determined based on the correspondence between the first address and the address information of the first server and the location information of the first service provided by the first server, such that a determining result is more accurate.

In a possible implementation, when the first network element is the session management network element, in S502, the session management network element directly sends the correspondence between the first address and the address information of the first server (where optionally, the location information of the first service provided by the first server is further included) to the user plane function network element.

In another possible implementation, when the first network element is the policy control network element, in S502, the policy control network element sends the correspondence between the first address and the address information of the first server (where optionally, the location information of the first service provided by the first server is further included) to the user plane function network element through the session management network element. It should be understood that, that the policy control network element sends the correspondence between the first address and the address information of the first server (where optionally, the location information of the first service provided by the first server is further included) to the user plane function network element through the session management network element means that the policy control network element sends the correspondence between the first address and the address information of the first server (where optionally, the location information of the first service provided by the first server is further included) to the session management network element according to a policy and charging control (PCC) rule and the session management network element then sends the correspondence between the first address and the address information of the first server (where optionally, the location information of the first service provided by the first server is further included) to the user plane function network element.

In another possible implementation, when the first network element is the first server, in S502, the first server sends the correspondence between the first address and the address information of the first server (where optionally, the location information of the first service provided by the first server is further included) to the user plane function network element through a second network element. The second network element may be a session management network element, a policy control network element, a unified data repository network element, or a unified data management network element.

For example, when the first network element is the first server, in S502, the first server sends the correspondence between the first address and the address information of the first server (where optionally, the location information of the first service provided by the first server is further included) to the session management network element, and the session management network element then sends the correspondence between the first address and the address information of the first server (where optionally, the location information of the first service provided by the first server is further included) to the user plane function network element.

For another example, when the first network element is the first server, in S502, the first server sends the correspondence between the first address and the address information of the first server (where optionally, the location information of the first service provided by the first server is further included) to the policy control network element, the policy control network element sends the correspondence between the first address and the address information of the first server (where optionally, the location information of the first service provided by the first server is further included) to the session management network element according to the PCC rule, and the session management network element then sends the correspondence between the first address and the address information of the first server (where optionally, the location information of the first service provided by the first server is further included) to the user plane function network element.

For another example, when the first network element is the first server, in S502, the first server sends the correspondence between the first address and the address information of the first server (where optionally, the location information of the first service provided by the first server is further included) to the network exposure function network element, the network exposure function network element sends the correspondence between the first address and the address information of the first server (where optionally, the location information of the first service provided by the first server is further included) to the unified data management network element/the unified data repository network element, the policy control network element obtains the correspondence between the first address and the address information of the first server (where optionally, the location information of the first service provided by the first server is further included) from the unified data management network element/the unified data repository network element, the policy control network element sends the correspondence between the first address and the address information of the first server (where optionally, the location information of the first service provided by the first server is further included) to the session management network element according to the PCC rule, and the session management network element then sends the correspondence between the first address and the address information of the first server (where optionally, the location information of the first service provided by the first server is further included) to the user plane function network element.

For another example, when the first network element is the first server, in S502, the first server sends the correspondence between the first address and the address information of the first server (where optionally, the location information of the first service provided by the first server is further included) to the network exposure function network element, the network exposure function network element sends the correspondence between the first address and the address information of the first server (where optionally, the location information of the first service provided by the first server is further included) to the unified data management network element/the unified data repository network element, the session management network element obtains the correspondence between the first address and the address information of the first server (where optionally, the location information of the first service provided by the first server is further included) from the unified data management network element/the unified data repository network element, and the session management network element then sends the correspondence between the first address and the address information of the first server (where optionally, the location information of the first service provided by the first server is further included) to the user plane function network element.

The following describes, using an example, the correspondence between the first address and the address information of the first server (where optionally, the location information of the first service provided by the first server is further included) that is sent by the first network element to the user plane function network element in S502.

For example, the correspondence between the first address and the address information of the first server may be that shown in Table 1.

TABLE 1

| IP address 1 | First address A |
|---|---|

For example, the correspondence between the first address and the address information of the first server may alternatively be {IP address 1, first address A}.

In a possible implementation, in S502, when sending the correspondence between the first address and the address information of the first server to the user plane function network element, the first network element also sends the location information of the first service provided by the first server. The correspondence between the first address and the address information of the first server sent by the first network element to the user plane function network element may also include the location information of the first service provided by the first server, or may be understood as a correspondence among the first address, the address information of the first server, and the location information of the first service provided by the first server.

For example, the correspondence between the first address and the address information of the first server may be that shown in Table 2.

TABLE 2

| IP address 1 | First address A | Location information of a first service provided by a first server |
|---|---|---|

For example, the correspondence between the first address and the address information of the first server may alternatively be {IP address 1, first address A, location information of a first service provided by a first server}.

It should be noted that the foregoing examples are merely examples of describing content and a form of the correspondence between the first address and the address information of the first server (where the IP address is used as an example in this specification, but does not constitute a specific limitation), and do not constitute a specific limitation.

In a possible implementation, in S502, the first network element may send the correspondence between the first address and the address information of the first server (where optionally, the location information of the first service provided by the first server is further included) to each user plane function network element connected to the first network element.

In another possible implementation, in S502, the first network element may select one or more user plane function network elements according to a first preset rule, and send the correspondence between the first address and the address information of the first server (where optionally, the location information of the first service provided by the first server is further included).

The first preset rule may include: selecting a user plane function network element whose service area includes a service area of a server that provides the first service, selecting a user plane function network element that provides a service on a movement path of the UE that supports the first service, or the like. Content of the first preset rule is not specifically limited in this embodiment of this application.

According to the communication method provided in this application, after determining the first address used by the user equipment to send the data packet of the first service, the first network element associates the first address with address information of a server that provides the first service, and sends, to the user plane function network element, a correspondence between the first address and the address information of the server that provides the first service. Therefore, when the server is localized, a first address of each service only needs to be configured. Through conversion of the first address, when receiving a data packet that is sent by the user equipment and whose destination address is a first address of a service, the user plane function network element determines, based on the first address, a server that provides the service for the user equipment, such that server selection is unrelated to the user equipment, and server-related information does not need to be configured for the user equipment. As a result, implementation of a data transmission process is simple, resources are saved, and security is improved.

In the communication method shown in FIG. 5, the method may further include any one or more optional steps of step S503 to step S509.

S503: The first network element sends a correspondence between the first address and the service identifier of the first service to the UE.

For example, the first network element has determined the first address in S501, and in S503, the first network element binds the first address and the service identifier of the first service to form the correspondence, and sends the correspondence to the UE. When performing the first service, the UE sends the data packet of the first service based on the correspondence using the first address as the destination address.

For example, the correspondence between the first address and the service identifier of the first service may be that shown in Table 3.

TABLE 3

| Service identifier of a first service | First address B |
|---|---|

For example, the correspondence between the first address and the service identifier of the first service may alternatively be {service identifier of a first service, first address B}.

It should be noted that the foregoing examples are merely examples of describing content and a form of the correspondence between the first address and the service identifier of the first service, and do not constitute a specific limitation.

For example, in S503, the first network element may directly send the correspondence between the first address and the service identifier of the first service to the UE, or the first network element may send the correspondence between the first address and the service identifier of the first service to the UE through forwarding of another network element. In S503, the first network element may send the correspondence between the first address and the service identifier of the first service to the UE in, but not limited to, the following three implementations.

Implementation A: The first network element is the first server, and in S503, the first network element directly sends the correspondence between the first address and the service identifier of the first service to the UE.

For example, the first server is a V2X AS, a V1 interface is configured between the V2X AS and V2X UE, and the V2X AS may directly send the correspondence between the first address and the service identifier of the first service to the UE through the V1 interface.

Implementation B: The first network element is the first server, and in S503, the first network element sends the correspondence between the first address and the service identifier of the first service to the UE through the policy control network element.

In a possible implementation, when the implementation B is used in S503, a process in which the first network element sends the correspondence between the first address and the service identifier of the first service to the UE through the policy control network element in S503 includes: The first network element sends the correspondence between the first address and the service identifier of the first service to the policy control network element, and then the policy control network element sends the correspondence between the first address and the service identifier of the first service to the UE. For an implementation in which the first network element sends the correspondence between the first address and the service identifier of the first service to the policy control network element, refer to the process in which the first network element sends the correspondence between the first address and the address information of the first server (where optionally, the location information of the first service provided by the first server is further included) to the policy control network element in S502. Details are not described herein again.

Further, the correspondence between the first address and the service identifier of the first service sent by the first network element to the policy control network element and the correspondence between the first address and the address information of the first server sent by the first network element to the policy control network element that are mutually independent (where optionally, the location information of the first service provided by the first server is further included) may be carried in one message. The first network element sends the message to the policy control network element, and the policy control network element obtains the two mutually independent correspondences from the message and then sends the two mutually independent correspondences to the user plane function network element and the UE. Alternatively, the first network element may send a correspondence between the first address, the service identifier of the first service, and the address information of the first server (where optionally, the location information of the first service provided by the first server is carried) to the policy control network element. The policy control network element obtains the correspondence between the first address and the service identifier of the first service and sends the correspondence to the UE; and obtains the correspondence between the first address and the address information of the first server and sends the correspondence (where optionally, the location information of the first service provided by the first server is carried) to the user plane function network element.

For example, the correspondence between the first address, the service identifier of the first service, and the address information of the first server may be that shown in Table 4.

TABLE 4

| IP address 3 | First address C | Service identifier of a first service |
|---|---|---|

For example, the correspondence between the first address, the service identifier of the first service, and the address information of the first server may alternatively be {IP address 3, first address C, service identifier of a first service}.

It should be noted that the foregoing examples are merely examples of describing content and a form of the correspondence between the first address, the service identifier of the first service, and the address information (for example, the IP address) of the first server, and do not constitute a specific limitation.

In a possible implementation, in S503, the first network element may send the correspondence between the first address and the service identifier of the first service to each UE connected to the first network element.

In another possible implementation, in S503, the first network element may select one or more UEs according to a second preset rule, and send the correspondence between the first address and the service identifier of the first service.

The second preset rule may include: selecting all UEs supporting the first service, selecting all UEs connected to the first network element, or the like. Content of the second preset rule is not specifically limited in this embodiment of this application.

S504: The user plane function network element obtains the correspondence between the first address and the address information of the first server.

Optionally, in S504, the user plane function network element may further obtain the location information of the first service provided by the first server.

In a possible implementation, in S504, when the first network element is the session management network element, the user plane function network element directly obtains the correspondence between the first address and the address information of the first server from the session management network element (where optionally, the location information of the first service provided by the first server is further obtained).

In a possible implementation, in S504, when the first network element is the policy control network element, the user plane function network element obtains the correspondence between the first address and the address information of the first server from the session management network element (where optionally, the location information of the first service provided by the first server is further obtained). The correspondence between the first address and the address information of the first server (where optionally, there is further the location information of the first service provided by the first server) is generated by the policy control network element and sent to the session management network element.

In a possible implementation, in S504, when the first network element is the first server, the user plane function network element obtains the correspondence between the first address and the address information of the first server from the session management network element (where optionally, the location information of the first service provided by the first server is further obtained). The correspondence between the first address and the address information of the first server (where optionally, there is further the location information of the first service provided by the first server) is sent by the first server to the unified data management network element/the unified data repository network element, and is obtained by the session management network element from the unified data management network element/the unified data repository network element.

In a possible implementation, in S504, when the first network element is the first server, the user plane function network element obtains the correspondence between the first address and the address information of the first server from the policy control network element (where optionally, the location information of the first service provided by the first server is further obtained) through forwarding of the session management network element. The correspondence between the first address and the address information of the first server (where optionally, there is further the location information of the first service provided by the first server) is sent by the first server to the unified data management network element/the unified data repository network element, and is obtained by the policy control network element from the unified data management network element/the unified data repository network element.

Content obtained by the user plane function network element in S504 is content sent by the first network element to the user plane function network element in S502. An obtaining manner in S504 is similar to a sending manner in S502, and details are not described herein again.

For example, in S504, the user plane function network element obtains the correspondence between the first address and the address information of the first server (where optionally, the location information of the first service provided by the first server is further obtained) and then performs recording, to obtain correspondences between first addresses of different services and address information of a plurality of different first servers (where optionally, the location information of the first service provided by the first server is further obtained). If receiving a data packet that is sent by the UE and whose destination address is a first address of a service, the user plane function network element may determine address information of a server that provides the service for the UE, and send the data packet of the service to the corresponding server through an address indicated by the address information. A process is described in detail in subsequent steps.

For example, the correspondences between the first addresses of the different services and the address information of the plurality of different servers obtained by the user plane function network element (where optionally, the location information of the first service provided by the first server is further obtained) may be that shown in Table 5.

The user plane function network element may further record location information of different services provided by a server corresponding to each piece of address information in Table 5 (in a case in which the location information is obtained). Certainly, the location information that is of the different services provided by the server corresponding to each piece of address information in Table 5 and that is recorded by the user plane function network element may alternatively be combined in Table 5 as one column. In this case, the correspondences between the first addresses of the different services and the address information of the plurality of different servers obtained by the user plane function network element and the location information of the different services provided by each server may be that shown in Table 6.

TABLE 5

| Server IP address | Address used by UE to send a data packet to a user plane function network element |
|---|---|
| 192.168.0.1 | Address X of a first service |
| 192.168.1.5 | Address X of the first service |
| 192.168.2.7 | Address X of the first service |
| . . . | . . . |
| 192.168.0.1 | Address Y of a second service |
| 192.168.2.7 | Address Y of the second service |
| 192.168.4.9 | Address Y of the second service |
| . . . | . . . |

TABLE 6

| Server IP address | Address used by UE to send a data packet to a user plane function network element | Location information of a service provided by a server |
|---|---|---|
| 192.168.0.1 | Address X of a service M | Location information 1 |
| 192.168.1.5 | Address X of the service M | Location information 2 |
| 192.168.2.7 | Address X of the service M | Location information 3 |
| ... | ... | ... |
| 192.168.0.1 | Address Y of a service N | Location information 1 |
| 192.168.2.7 | Address Y of the service N | Location information 3 |
| 192.168.4.9 | Address Y of the service N | Location information 4 |
| ... | ... | ... |

It should be noted that the foregoing examples are merely examples of describing content and a form of the correspondences between the first addresses of the different services and the address information (for example, IP addresses) of the plurality of different servers obtained by the user plane function network element (where optionally, the location information of the different services provided by each server is included), and do not constitute a specific limitation. During actual application, the content and the form of the correspondences between the first addresses of the different services and the address information of the plurality of different servers obtained by the user plane function network element (where optionally, the location information of the different services provided by each server is included) may be configured based on an actual requirement.

S505: The UE receives the correspondence between the first address and the service identifier of the first service.

The correspondence that is between the first address and the service identifier of the first service and that is received by the UE in S505 is the correspondence sent by the first network element to the UE in S503.

Optionally, S505 may be implemented in, but not limited to, the following two solutions.

Solution a: The UE receives the correspondence between the first address and the service identifier of the first service from the policy control network element.

In the solution a, the policy control network element generates the correspondence between the first address and the service identifier of the first service, may obtain the correspondence between the first address and the service identifier of the first service from the session management network element, or may obtain the correspondence between the first address and the service identifier of the first service from the first server that provides the first service. This is not specifically limited in this embodiment of this application.

Solution b: The UE receives the correspondence between the first address and the service identifier of the first service from the first server that provides the first service.

It should be noted that a receiving manner in S505 is similar to the sending manner in S502, and details are not described herein again.

For example, in S505, the UE receives the correspondence between the first address and the service identifier of the first service and then performs recording, to obtain correspondences between first addresses and service identifiers of a plurality of different services. If the UE sends a data packet of a service, the UE obtains, based on the correspondence, a first address corresponding to a service identifier of the service, and sends the data packet to the user plane function network element using the first address corresponding to the service identifier of the service as a destination address of the data packet of the service. A process is described in detail in subsequent steps.

For example, the correspondences that are between the first addresses and the service identifiers of the different services and that are obtained by the UE may be that shown in Table 7.

TABLE 7

| Service identifier | First address of a service |
|---|---|
| Service M | Address X of the service M |
| Service N | Address Y of the service N |
| ... | ... |

It should be noted that the foregoing example is merely an example of describing content and a form of the correspondences that are between the first addresses and the service identifiers of the plurality of different services and that are obtained by the UE, and does not constitute a specific limitation. During actual application, the content and the form that are of the first addresses of the plurality of different services and that are obtained by the UE may be configured based on an actual requirement.

S506: The UE sends the data packet of the first service using the first address as the destination address.

For example, when the UE performs the first service, the UE may obtain the first address based on the correspondence between the first address and the service identifier of the first service obtained in S505, and then perform S506 to send the data packet of the first service.

For example, it is assumed that the UE obtains the first addresses corresponding to the different service identifiers shown in Table 7. When the UE performs the service M, the UE may obtain, based on content in Table 7, the address X corresponding to the service identifier of the service M, and then send a data packet of the service M to the user plane function network element using the address X as a destination address.

Optionally, when sending the data packet of the first service, the UE may further include location information of the UE accessing a network in the data packet of the first service, where the location information of the UE accessing the network is used to indicate a current geographic location of the UE.

Optionally, when sending the data packet of the first service, the UE may further include an identifier of the UE in the data packet of the first service, where the identifier of the UE is used to uniquely indicate the UE. A type and content of the identifier of the UE are not specifically limited in this embodiment of this application.

S507: The user plane function network element receives a second address from the UE.

The second address is the same as the first address, and both are addresses used by the UE to send the first service to the user plane function network element.

For example, in S507, the user plane function network element may receive, from the UE, a data packet of the first service whose destination address is the second address, to receive the second address.

For example, in S507, the user plane function network element may receive a data packet whose destination address is the address X and that is sent by the UE, and the user plane function network element may determine, based on content shown in Table 5 or Table 6, that the data packet whose address is the address X and that is sent by the UE is a data packet of the service M.

Optionally, if the user plane function network element obtains only the correspondence between the first address and the address information of the first server in S504, S509 is directly performed after S507. If the user plane obtains the location information of the first service provided by the first server in S504, S508 is performed after S507 and then S509 is performed in the communication method provided in this embodiment of this application.

S508: The user plane function network element obtains the location information of the UE accessing the network.

Optionally, in S508, the user plane function network element may obtain, in, but not limited to, the following two manners, the location information of the UE accessing the network.

Manner 1: The user plane function network element receives the location information of the UE accessing the network from the UE.

For example, the data packet that is of the first service and that is received by the user plane function network element from the UE carries the location information of the UE.

Manner 2: The user plane function network element obtains the location information of the UE from a mobility management network element.

The mobility management network element may include an AMF network element in the 5G system.

For example, the data packet that is of the first service and that is received by the user plane function network element from the UE carries the identifier of the UE, and the user plane function network element may obtain, from the mobility management network element based on the identifier of the UE, the location information of the UE accessing the network.

S509: The user plane function network element determines, based on the second address and the correspondence between the first address and the address information of the first server, the second server that provides the first service for the UE.

The first server includes the second server.

In a possible implementation, that the user plane function network element determines, based on the second address and the correspondence between the first address and the address information of the first server, the second server that provides the first service for the UE in S509 may include: The user function network element determines a server indicated by address information corresponding to the second address in the correspondence as the second server that provides the first service for the UE. In this case, there are one or more second servers.

In another possible implementation, in S504, the user plane function network element obtains the correspondence between the first address and the address information of the first server and the location information of the first service provided by the first server, and the user plane function network element performs S508 to obtain the location information of the UE accessing the network. That the user plane function network element determines, based on the second address and the correspondence between the first address and the address information of the first server, the second server that provides the first service for the UE in S509 may include: The user plane function network element determines that a location indicated by location information of the first service provided by the second server includes a location indicated by the location information of the UE accessing the network. Alternatively, the user plane function network element determines that the location information of the user equipment accessing the network falls within a range indicated by location information of the first service provided by the second server. In this case, there are one or more second servers.

For example, in an implementation of S509, the user plane function network element selects, based on the correspondence between the first address and the address information of the first server, list information of all second servers corresponding to the second address. The user plane function network element selects, from the list information based on the location information of the first service provided by the second server and the location information of the user equipment accessing the network, the second server that provides the first service for the user equipment. The location indicated by the location information of the first service provided by the second server that provides the first service for the user equipment includes the location indicated by the location information of the UE accessing the network.

For example, in an implementation of S509, the user plane function network element selects, based on the location information of the user equipment accessing the network, a list of all second servers that can provide a service at a user network access location. The user plane function network element selects, from the list based on the correspondence between the first address and the address information of the first server, the second server that corresponds to the first address and provides the first service for the user equipment.

For example, assuming that in S507, the user plane function network element may receive the data packet whose destination address is the address X and that is sent by the UE, the user plane function network element may determine, based on the content shown in Table 5 or Table 6, that the data packet whose address is the address X and that is sent by the UE is the data packet of the service M. Assuming that the location information of the UE accessing the network indicates that the UE is located in a service area indicated by the location information 3 in Table 6, the user plane function network element determines that a server whose IP address is 192.168.2.7 provides the service M for the UE.

Further, in S509, if the user plane function network element determines that there are a plurality of second servers that provide the first service for the UE, that the user plane function network element determines, based on the second address and the correspondence between the first address and the address information of the first server, the second server that provides the first service for the UE may be implemented as follows: The user plane function network element selects, according to a preset rule, one second server to provide the first service for the UE.

The preset rule may be randomly selecting a server, selecting a server with a lowest load rate, selecting a server in a polling manner, selecting a server with a nearest straight-line distance, or the like. Content of the preset rule is not specifically limited in this embodiment of this application.

After the user plane function network element determines the second server that provides the first service for the UE in S509, the user plane function network element sends the data packet of the first service to the second server using an address indicated by address information of the second server as a destination address.

It should be noted that an execution sequence of S501 to S509 may be configured based on an actual requirement. FIG. 5 in this application shows merely a feasible execution sequence, but this is not specifically limited.

According to the communication method provided in this application, after determining the first address used by the user equipment to send the data packet of the first service, the first network element associates the first address with address information of a server that provides the first service, and sends, to the user plane function network element, a correspondence between the first address and the address information of the server that provides the first service. Therefore, when the server is localized, a first address of each service only needs to be configured. Through conversion of the first address, when receiving a data packet that is sent by the user equipment and whose destination address is a first address of a service, the user plane function network element determines, based on the first address, a server that provides the service for the user equipment, such that server selection is unrelated to the user equipment, and server-related information does not need to be configured for the user equipment. As a result, implementation of a data transmission process is simple, resources are saved, and security is improved.

The following describes in detail the solutions provided in this application using several embodiments, but this constitutes no specific limitation.

Embodiment 1

Figure 6:
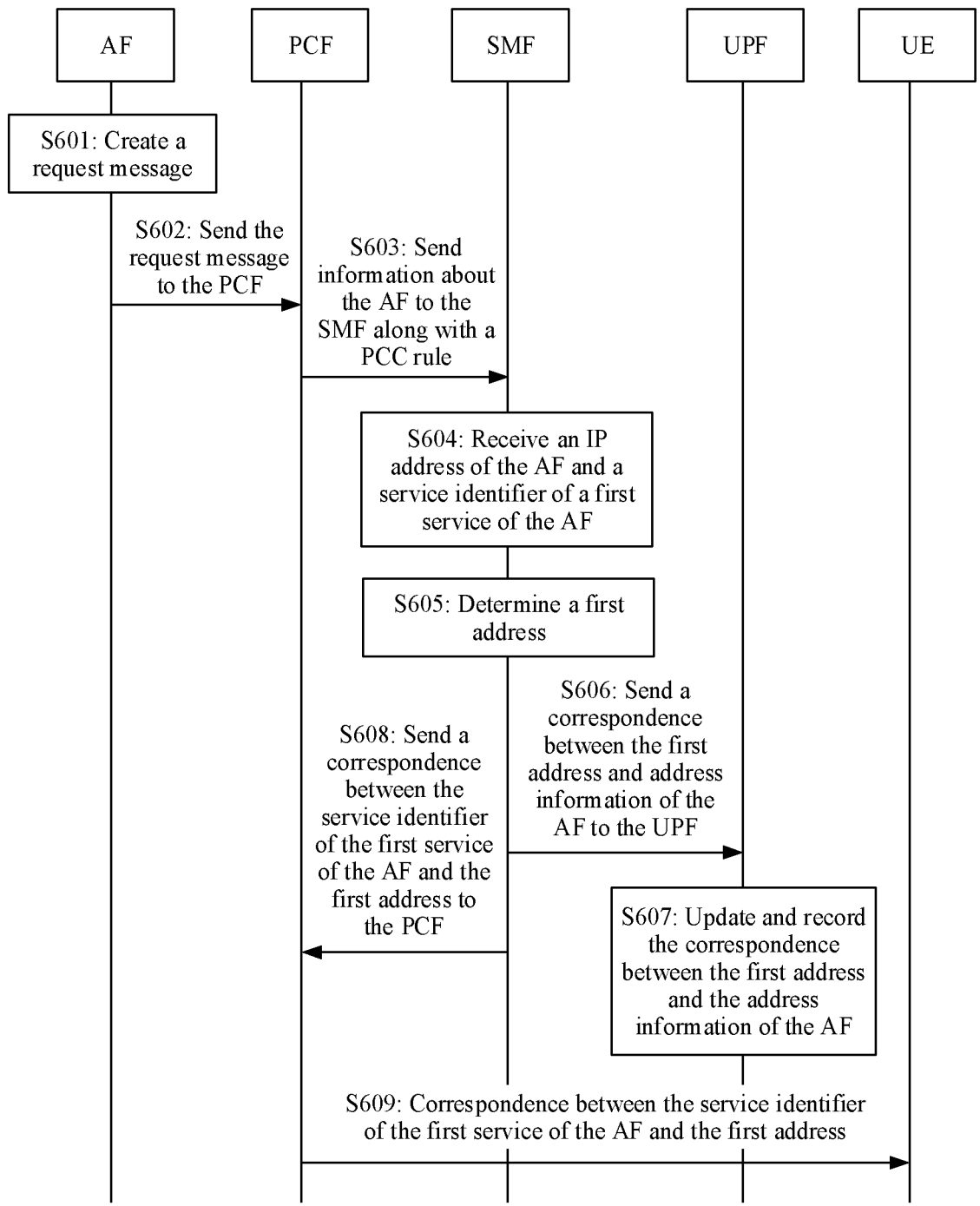
FIG. 6 is a flowchart of another communication method according to an embodiment of this application.

This application provides a communication method. As shown in FIG. 6, the method may include the following steps.

S601: An AF creates a request message.

For example, when initiating service creation of a first service or modifying or deleting a service request of an existing first service, the AF performs S601. Content of the request message includes address information (e.g., an IP address, an FQDN address, or the like) of the AF and a service identifier of the first service provided by the AF (where optionally, the content of the request message further includes location information (which may be coordinate information, or a GEO ID provided by a network side) corresponding to the first service provided by the AF).

Optionally, the request message may further include an operation identifier, used to identify an operation. For example, the operation identifier may be an AF transaction ID.

For example, the request message may be a traffic influence creation message (such as an Nnef_TrafficInfluence_Create message), a traffic influence update message (such as an Nnef_TrafficInfluence_Update message), a traffic influence deletion message (such as an Nnef_TrafficInfluence_Delete message), a parameter provision creation message (such as an Nnef_ParameterProvision_Create message), a parameter provision update message (such as an Nnef_ParameterProvision_Update message), or a parameter provision deletion message (such as an Nnef_ParameterProvision_Delete message).

S602: The AF sends the request message to a PCF.

In a possible implementation, if an operator does not allow the AF to send the request message to the PCF, S602 is implemented as S602*a* to S602*e*.

S602*a*: The AF sends the request message to a NEF.

S602*b*: The NEF performs authorization control on whether the AF can initiate a request.

For example, the NEF searches a list of AFs that can provide services or a similar database based on a source IP of the request message of the AF or an identifier of the AF, determines whether a corresponding service may be provided for the AF, and determines that the content of the request message initiated by the AF may be mapped to information required by a core network element (for example, based on an implementation status of the operator, as described in section 4.3.6.1 in 3GPP TS 23.502, a corresponding operation such as the identifier of the first service provided by the AF corresponding to a DNN of a core network and S-NSSAI). After authorization control succeeds, the NEF converts the AF transaction ID into an AF transaction internal ID (an ID internally used in the core network) for another network element of the core network to use.

Optionally, if the location information in the request message sent by the AF is coordinate location information, the NEF converts the coordinate location information carried in the request message of the AF into a GEO ID. An example conversion process is querying a correspondence between the coordinate location information and the GEO ID, and details are not described herein.

After authorization control succeeds in S602*b*, S602*c* is performed.

S602*c*: The NEF sends the request message to a UDR or a UDM.

S602*d*: The UDR or the UDM creates, updates, or deletes information storage based on the request message.

In S602*d*, the UDR or the UDM modifies (including creation, update, and deletion) information stored in the AF based on the AF transaction internal ID. After the modification, the UDR or the UDM sends latest information about the AF (that is, information in the request message sent by the AF) to a PCF. The latest information about the AF sent by the UDR or the UDM includes an IP address of the AF and the service identifier of the first service of the AF (where optionally, the latest information about the AF further includes the location information corresponding to the first service provided by the AF).

S602*e*: The NEF sends feedback information to the AF.

In a possible implementation, if the operator allows the NEF to send the feedback information to the AF, the AF directly sends the request message to the PCF.

If the PCF directly receives the request message of the AF, the PCF performs authorization control on the content of the request message. An operation is similar to the authorization control operation performed by the NEF in S602*b*, and details are not described herein again.

S603: The PCF sends the information about the AF to an SMF along with a PCC rule.

The information about the AF includes the IP address of the AF and the service identifier of the first service of the AF (where optionally, the information about the AF further includes the location information corresponding to the first service provided by the AF).

Optionally, after the PCF receives the information about the AF from the AF, the UDR, or the UDM, if the information about the AF includes the location information corresponding to the first service provided by the AF and the location information is location information such as coordinates, the PCF may convert the location information into a GEO ID. A conversion process is querying a correspondence between the location information and the GEO ID, and details are not described herein.

S604: The SMF receives the IP address of the AF and the service identifier of the first service of the AF.

Optionally, in S604, the SMF may further receive the location information of the first service provided by the AF.

S605: The SMF determines a first address.

The first address is used by UE to send a data packet of the first service to a UPF.

In S605, the SMF determines, based on the received service identifier of the first service of the AF, whether an existing first address corresponding to the service identifier of the first service exists. If a first address corresponding to the service identifier of the first service already exists, the existing first address is used. If a first address corresponding to the service identifier of the first service does not exist, the SMF regenerates a first address corresponding to the identifier of the first service.

The SMF binds the first address and the received service identifier of the first service of the AF to form a correspondence, and binds the first address and the address information of the AF to form a correspondence.

S606: The SMF sends the correspondence between the first address and the address information of the AF to the UPF.

Optionally, in S606, when sending the correspondence between the first address and the address information of the AF to the UPF, the SMF may further send, to the UPF, the location information of the first service provided by the AF.

The SMF may select the UPF according to the foregoing first preset rule and perform S606.

S607: The UPF updates and records the correspondence between the first address and the address information of the AF.

Optionally, in S607, when updating and recording the correspondence between the first address and the address information of the AF, the UPF may further update and record the location information of the first service provided by the AF.

In a possible implementation, when the UE performs unicast on a target AF using the first address, after receiving a data packet from the UE, the UPF converts the first address into unicast destination address information (the IP address or the FQDN address) of the AF based on the correspondence between the first address and the address information of the AF configured by the SMF and a destination address of the data packet, to provide a data communication service for the UE and the AF. An example process of converting the first address into the unicast destination address information of the AF is: selecting server address information corresponding to the destination address in the correspondence, and selecting one piece of server address information as the unicast destination address information. For a selection process of selecting one piece of server address information as the unicast destination address information, refer to the foregoing preset rule. Details are not described herein again.

In another possible implementation, when the UE performs unicast on a target AF using the first address, after receiving a data packet from the UE, the UPF converts the first address into a unicast destination IP address of the AF based on a destination address of the data packet, location information of the UE (sent by the UE together with the data packet or obtained by the UPF from an AMF through the SMF), the correspondence configured by the SMF, and the location information of the first service provided by the AF, to provide a data communication service for the UE and the AF. A process of converting the first address into the unicast destination address information of the AF is: selecting address information of a server that corresponds to the destination address in the correspondence and provides a location indicated by the location information of the first service including a location indicated by location information of the UE accessing a network, and selecting one piece of server address information as the unicast destination address information. For a selection process of selecting one piece of server address information as the unicast destination address information, refer to the foregoing preset rule. Details are not described herein again.

Correspondingly, when the AF sends downlink data to the UE, the UPF optionally converts the address information of the AF into the first address corresponding to the address information of the AF as a source address of the AF, or directly uses an address indicated by the address information of the AF as a source address.

S608: The SMF sends the correspondence between the service identifier of the first service of the AF and the first address to the PCF.

S609: The PCF sends the correspondence between the service identifier of the first service of the AF and the first address to the UE.

In S609, the PCF sends the correspondence between the service identifier of the first service of the AF and the first address to the UE using a V2X communication parameter configuration or update procedure through an N1 interface of the AMF.

The PCF may select the UE according to the foregoing second preset rule and perform S609. Details are not described herein again.

Then, when performing the first service, the UE selects, based on the received correspondence, the first address corresponding to the service identifier of the first service as a destination address, and sends the data packet of the first service to the UPF. After receiving the data packet whose destination address is the first address, the UPF selects the AF that provides the first service for the UE and sends the data packet of the first service to the AF. A detailed process is not described again.

Embodiment 2

Figure 7:
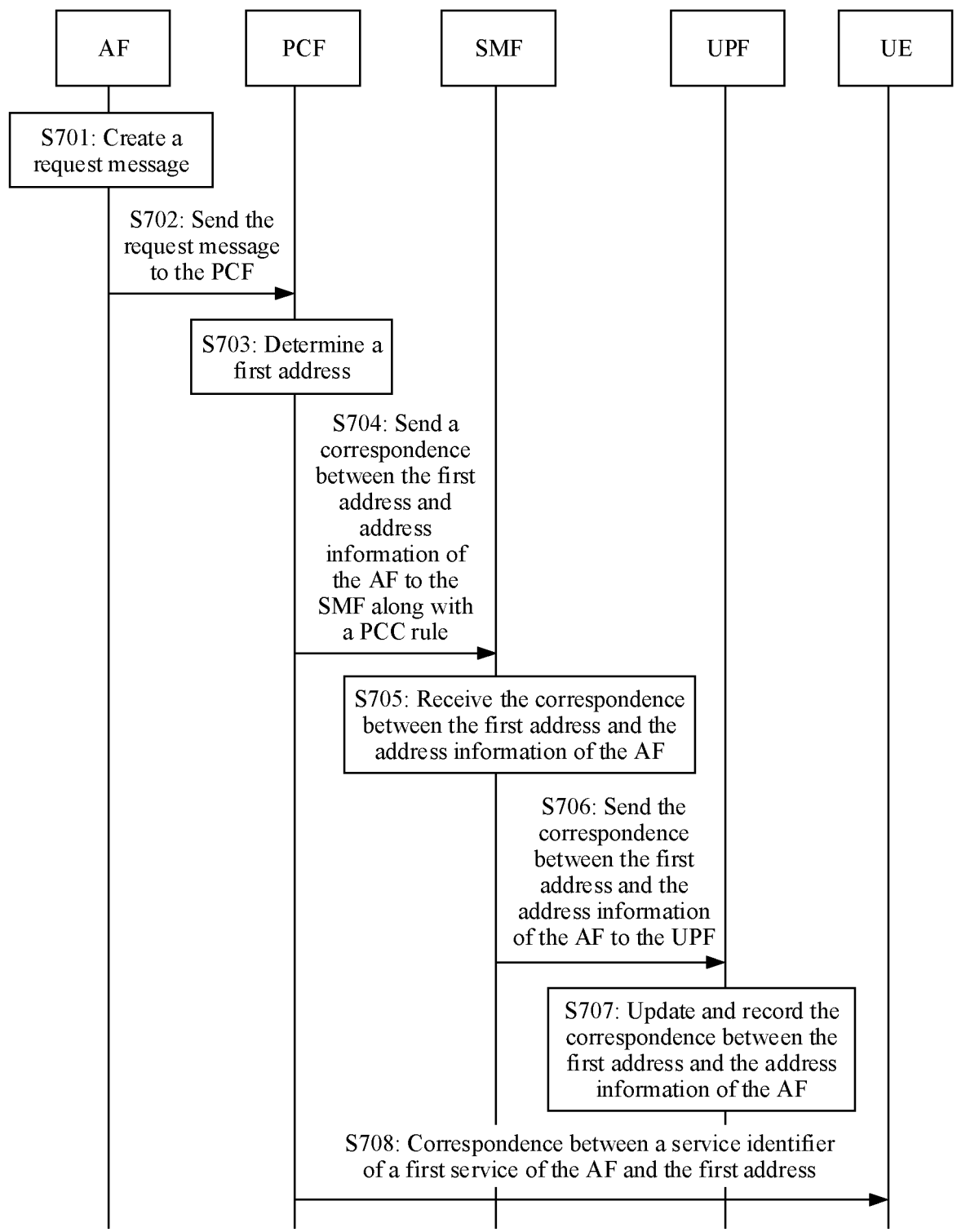
FIG. 7 is a flowchart of still another communication method according to an embodiment of this application.

This application provides another communication method. As shown in FIG. 7, the method may include the following steps.

S701: An AF creates a request message.

For example, for an implementation of S701, refer to the descriptions of S601. Details are not described again for an implementation.

S702: The AF sends the request message to a PCF.

For example, for an implementation of S702, refer to the descriptions of S602. Details are not described again for an implementation.

S703: The PCF determines a first address.

The first address is used by UE to send a data packet of a first service to a UPF.

For example, for an implementation of S703, refer to the descriptions of S605. Details are not described again for an implementation.

The PCF binds the first address and a received service identifier of the first service of the AF to form a correspondence, and binds the first address and address information of the AF to form a correspondence.

S704: The PCF sends the correspondence between the first address and the address information of the AF to an SMF along with a PCC rule.

Optionally, in S704, when sending the correspondence between the first address and the address information of the AF to the SMF along with the PCC rule, the PCF may further send, to the SMF, location information of the first service provided by the AF.

S705: The SMF receives the correspondence between the first address and the address information of the AF and sends the correspondence to the UPF.

Optionally, in S705, when sending the correspondence between the first address and the address information of the AF to the UPF, the SMF may further receive the location information of the first service provided by the AF.

S706: The SMF sends the correspondence between the first address and the address information of the AF to the UPF.

Optionally, in S706, when sending the correspondence between the first address and the address information of the AF to the UPF, the SMF may further send, to the UPF, the location information of the first service provided by the AF.

The SMF may select the UPF according to the foregoing first preset rule and perform S706.

S707: The UPF updates and records the correspondence between the first address and the address information of the AF.

For example, S707 is the same as S607, and an implementation is not described again.

S708: The PCF sends the correspondence between the service identifier of the first service of the AF and the first address to the UE.

In S708, the PCF sends the correspondence between the service identifier of the first service of the AF and the first address to the UE using a V2X communication parameter configuration or update procedure through an N1 interface of an AMF.

The PCF may select the UE according to the foregoing second preset rule and perform S708. Details are not described herein again.

Then, when performing the first service, the UE selects, based on the received correspondence, the first address corresponding to the service identifier of the first service as a destination address, and sends the data packet of the first service to the UPF. After receiving the data packet whose destination address is the first address, the UPF selects the AF that provides the first service for the UE and sends the data packet of the first service to the AF. A detailed process is not described again.

Embodiment 3

Figure 8:
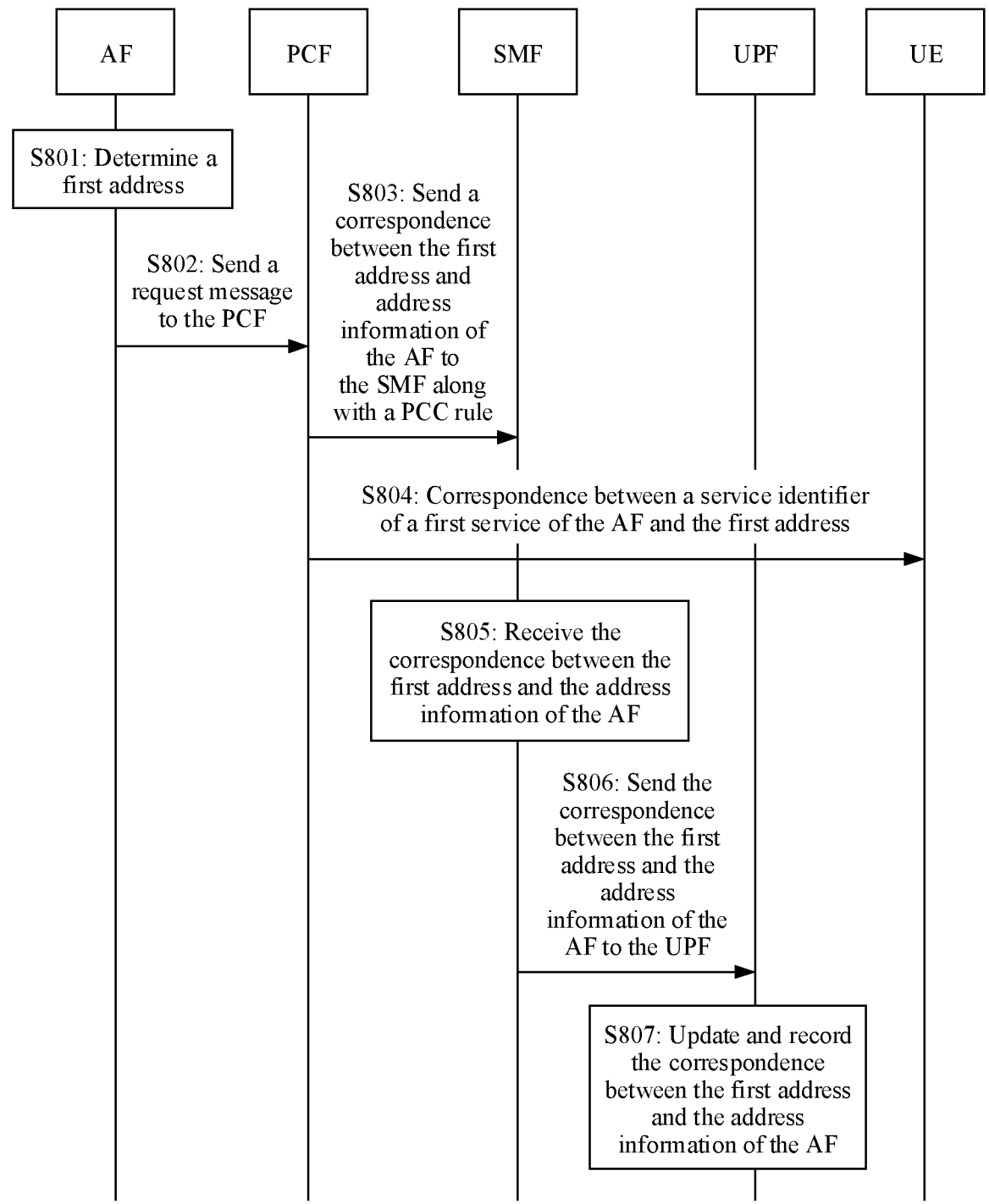
FIG. 8 is a flowchart of still another communication method according to an embodiment of this application.

This application provides another communication method. As shown in FIG. 8, the method may include the following steps.

S801: An AF determines a first address.

The first address is used by UE to send a data packet of a first service to a user plane function network element.

For example, when initiating service creation of the first service or modifying or deleting a service request of an existing first service, the AF performs S801.

It should be noted that for a determining process in S801, refer to the process in S605. Details are not described herein again.

S802: The AF sends a request message to a PCF.

Content of the request message includes a correspondence between a service identifier of the first service of the AF and the first address and a correspondence between the first address and address information of the AF (where optionally, the content of the request message may further include location information (which may be coordinate information, or a GEO ID provided by a network side) of the first service provided by the AF).

It should be noted that, for a sending manner in S802, refer to the \ sending manner in S602, but content of request messages is different. A sending process in S802 is not described herein again.

Optionally, after the PCF receives information about the AF from the AF, a UDR, or a UDM, if the information about the AF includes the location information of the first service provided by the AF and the location information is location information such as coordinates, the PCF may convert the location information into the GEO ID. A conversion process is querying a correspondence between the location information and the GEO ID, and details are not described herein.

S803: The PCF sends the correspondence between the first address and the address information of the AF to an SMF along with a PCC rule.

Optionally, in S803, the PCF may further send, to the SMF along with the PCC rule, the location information of the first service provided by the AF.

S804: The PCF sends the correspondence between the service identifier of the first service of the AF and the first address to the UE.

The PCF may select the UE according to the foregoing second preset rule and perform S804.

In S804, the PCF may send the correspondence to the UE using a V2X communication parameter configuration or update procedure through an N1 interface of an AMF.

S805: The SMF receives the correspondence between the first address and the address information of the AF.

Optionally, in S805, the SMF may further receive the location information of the first service provided by the AF.

S806: The SMF sends the correspondence between the first address and the address information of the AF to the UPF.

Optionally, in S806, when sending the correspondence between the first address and the address information of the AF to the UPF, the SMF may further send, to the UPF, the location information of the first service provided by the AF.

The SMF may select the UPF according to the foregoing first preset rule and perform S806.

S807: The UPF updates and records the correspondence between the first address and the address information of the AF.

It should be noted that, for an implementation of S807, refer to the implementation of S607. Details are not described herein again.

Then, when performing the first service, the UE selects, based on the received correspondence, the first address corresponding to the service identifier of the first service as a destination address, and sends the data packet of the first service to the UPF. After receiving the data packet whose destination address is the first address, the UPF selects the AF that provides the first service for the UE and sends the data packet of the first service to the AF. A detailed process is not described again.

Embodiment 4

Figure 9:
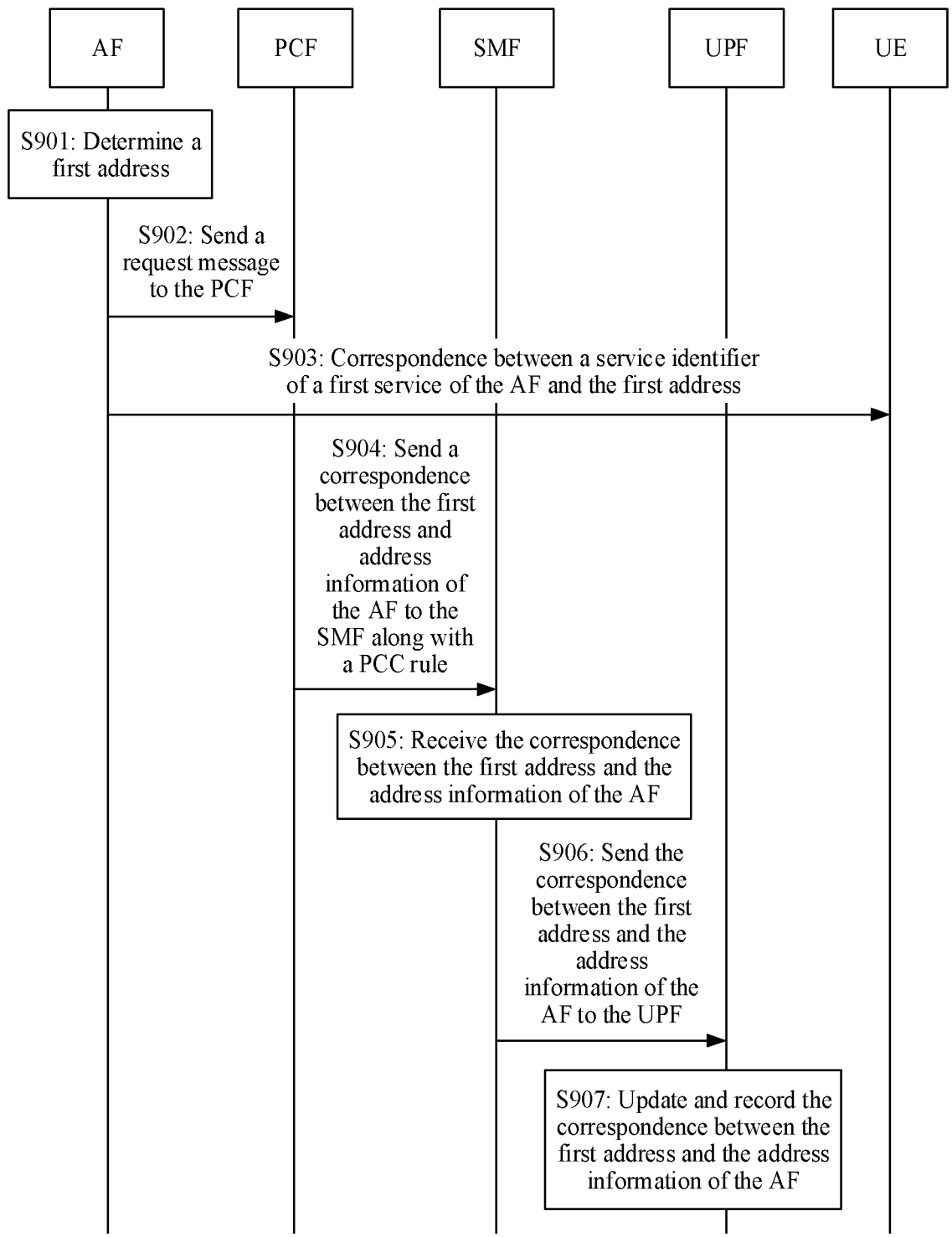
FIG. 9 is a flowchart of still another communication method according to an embodiment of this application.

This application provides another communication method. As shown in FIG. 9, the method may include the following steps.

S901: An AF determines a first address.

It should be noted that S901 is the same as S801, and an implementation is not described again.

S902: The AF sends a request message to a PCF.

Content of the request message includes a correspondence between the first address and address information of the AF (where optionally, the content of the request message may further include location information (which may be coordinate information, or a GEO ID provided by a network side) of a first service provided by the AF).

It should be noted that, for a sending manner in S902, refer to the sending manner in S602, but content of request messages is different. A sending process in S902 is not described herein again.

Optionally, after the PCF receives information about the AF from the AF, a UDR, or a UDM, if the information about the AF includes the location information of the first service provided by the AF and the location information is location information such as coordinates, the PCF may convert the location information into the GEO ID. A conversion process is querying a correspondence between the location information and the GEO ID, and details are not described herein.

S903: The AF sends a correspondence between a service identifier of the first service of the AF and the first address to UE.

The AF may select the UE according to the foregoing second preset rule and perform S903.

In S903, the AF may send the correspondence between the service identifier of the first service of the AF and the first address to the UE through an interface between the AF and the UE.

For example, a V2X AF may send a correspondence between an AF service identifier (for example, an APP ID) and the first address to V2X UE through a V1 interface.

S904: The PCF sends the correspondence between the first address and the address information of the AF to an SMF along with a PCC rule.

Optionally, in S904, the PCF may further send, to the SMF along with the PCC rule, the location information of the first service provided by the AF.

S905: The SMF receives the correspondence between the first address and the address information of the AF.

Optionally, in S905, the SMF may further receive the location information of the first service provided by the AF.

S906: The SMF sends the correspondence between the first address and the address information of the AF to a UPF.

Optionally, in S906, when sending the correspondence between the first address and the address information of the AF to the UPF, the SMF may further send, to the UPF, the location information of the first service provided by the AF.

The SMF may select the UPF according to the foregoing first preset rule and perform S906.

S907: The UPF updates and records the correspondence between the first address and the address information of the AF.

It should be noted that, for an implementation of S907, refer to the implementation of S607. Details are not described herein again.

Then, when performing the first service, the UE selects, based on the received correspondence, the first address corresponding to the service identifier of the first service as a destination address, and sends a data packet of the first service to the UPF. After receiving the data packet whose destination address is the first address, the UPF selects the AF that provides the first service for the UE and sends the data packet of the first service to the AF. A detailed process is not described again.

In the foregoing embodiments provided in this application, the methods provided in the embodiments of this application are separately described from a perspective of interaction among the first network element, the user plane function network element, and the user equipment. To implement functions in the methods provided in the embodiments of this application, the first network element, the user plane function network element, and the user equipment each may include a hardware structure and/or a software module, and implement the foregoing functions in a form of a hardware structure, a software module, or a combination of a hardware structure and the software module. Whether a function in the foregoing functions is performed using the hardware structure, the software module, or the combination of the hardware structure and the software module depends on particular applications and design constraint conditions of the technical solutions.

Module division in the embodiments of this application is an example, is merely logical function division, and may be other division during actual implementation. In addition, functional modules in the embodiments of this application may be integrated into one processor, or each of the modules may exist alone physically, or two or more modules are integrated into one module. The integrated module may be implemented in a form of hardware, or may be implemented in a form of a software functional module.

Figure 10:
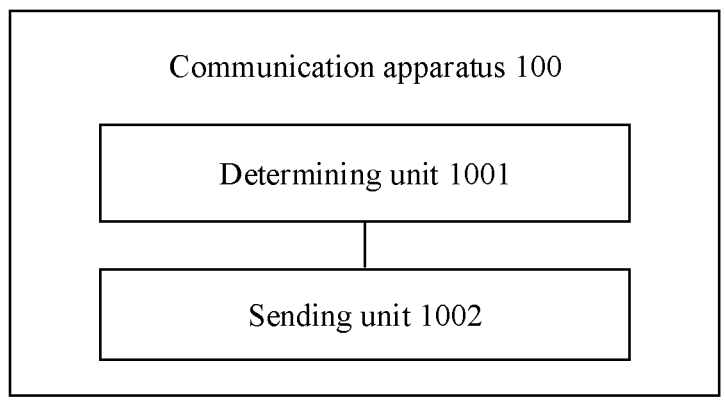
FIG. 10 is a schematic diagram of a structure of another communication apparatus according to an embodiment of this application.

When each functional module is obtained through division based on each corresponding function, FIG. 10 shows a communication apparatus 100 according to an embodiment of this application. The communication apparatus 100 is configured to implement functions of the first network element in the foregoing methods. The communication apparatus 100 may be the first network element, or may be an apparatus in the first network element, or may be an apparatus that can be used with the first network element. The communication apparatus 100 may be a chip system. In this embodiment of this application, the chip system may include a chip, or may include a chip and another discrete component. As shown in FIG. 10, the communication apparatus 100 may include a determining unit 1001 and a sending unit 1002. The determining unit 1001 is configured to perform S501 in FIG. 5, S605 in FIG. 6, S703 in FIG. 7, S801 in FIG. 8, or S901 in FIG. 9. The sending unit 1002 is configured to perform S502 and S503 in FIGS. 5, S606 and S608 in FIGS. 6, S704 and S708 in FIG. 7, S802 in FIG. 8, or S902 and S903 in FIG. 9. All related content of the steps in the foregoing method embodiments may be cited in function descriptions of corresponding functional modules. Details are not described herein again.

Figure 11:
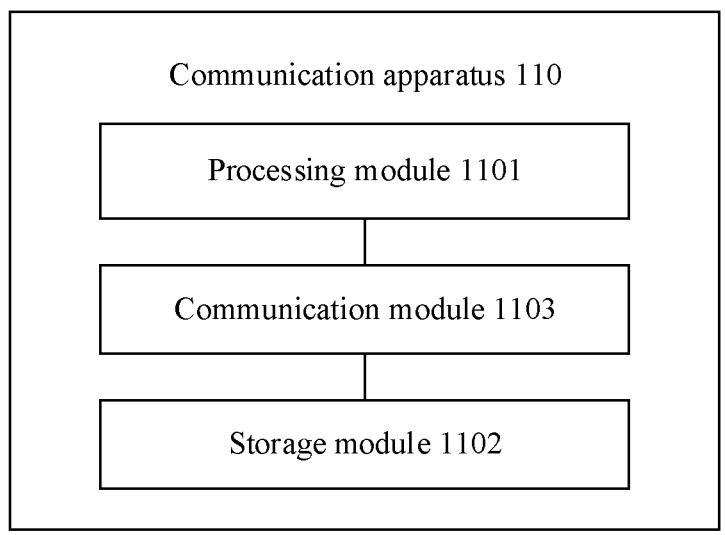
FIG. 11 is a schematic diagram of a structure of still another communication apparatus according to an embodiment of this application.

When an integrated unit is used, FIG. 11 shows a communication apparatus 110 according to an embodiment of this application. The communication apparatus 110 is configured to implement functions of the first network element in the foregoing methods. The communication apparatus 110 may be the first network element, or may be an apparatus in the first network element, or may be an apparatus that can be used with the first network element. The communication apparatus 110 may be a chip system. The communication apparatus 110 includes at least one processing module 1101 configured to implement the functions of the first network element in the methods provided in the embodiments of this application. For example, the processing module 1101 may be configured to perform S501 in FIG. 5, S605 in FIG. 6, S703 in FIG. 7, S801 in FIG. 8, or S901 in FIG. 9. For details, refer to detailed descriptions in the method examples. Details are not described herein again.

The communication apparatus 110 may further include at least one storage module 1102 configured to store program instructions and/or data. The storage module 1102 is coupled to the processing module 1101. The coupling in this embodiment of this application is indirect coupling or a communication connection between apparatuses, units, or modules for information exchange between the apparatuses, the units, or the modules, and may be in electrical, mechanical, or other forms. The processing module 1101 may cooperate with the storage module 1102. The processing module 1101 may execute the program instructions stored in the storage module 1102. At least one of the at least one storage module may be included in the processing module.

The communication apparatus 110 may further include a communication module 1103 configured to communicate with another device through a transmission medium, to determine that an apparatus in the communication apparatus 110 can communicate with the other device. The communication module 1103 is used by the apparatus to communicate with the other device. For example, the processing module 1101 performs S502 and S503 in FIGS. 5, S606 and S608 in FIGS. 6, S704 and S708 in FIG. 7, S802 in FIG. 8, or S902 and S903 in FIG. 9 through the communication module 1103.

When the processing module 1101 is a processor, the storage module 1102 is a memory, and the communication module 1103 is a communication interface, the communication apparatus 110 in FIG. 11 in this embodiment of this application may be the communication apparatus 40 shown in FIG. 4.

As described above, the communication apparatus 100 or the communication apparatus 110 provided in the embodiments of this application may be configured to implement functions of the first network element in the methods implemented in the foregoing embodiments of this application. For ease of description, only a part related to the embodiments of this application is shown. For technical details that are not disclosed, refer to the embodiments of this application.

Figure 12:
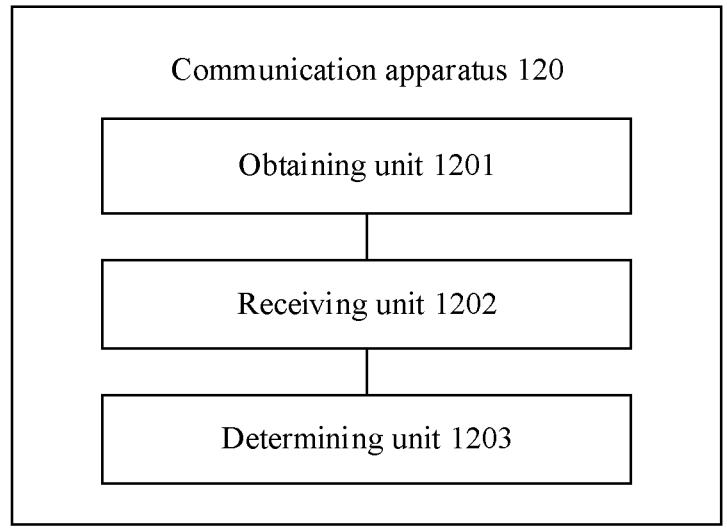
FIG. 12 is a schematic diagram of a structure of yet another communication apparatus according to an embodiment of this application.

When each functional module is obtained through division based on each corresponding function, FIG. 12 shows a communication apparatus 120 according to an embodiment of this application. The communication apparatus 120 is configured to implement functions of the user plane function network element in the foregoing methods. The communication apparatus 120 may be the user plane function network element, an apparatus in the user plane function network element, or an apparatus that can be used with the user plane function network element. The communication apparatus 120 may be a chip system. In this embodiment of this application, the chip system may include a chip, or may include a chip and another discrete component. As shown in FIG. 12, the communication apparatus 120 may include an obtaining unit 1201, a receiving unit 1202, and a determining unit 1203. The obtaining unit 1201 is configured to perform S504 in FIG. 5, S607 in FIG. 6, S707 in FIG. 7, S807 in FIG. 8, or S907 in FIG. 9. The receiving unit 1202 is configured to perform S507 in FIG. 5. The determining unit 1203 is configured to perform S509 in FIG. 5. All related content of the steps in the foregoing method embodiments may be cited in function descriptions of corresponding functional modules. Details are not described herein again.

Figure 13:
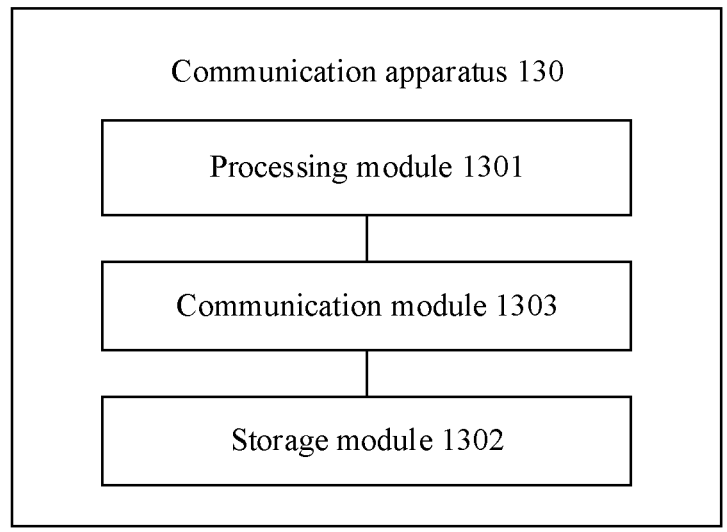
FIG. 13 is a schematic diagram of a structure of yet another communication apparatus according to an embodiment of this application.

When an integrated unit is used, FIG. 13 shows a communication apparatus 130 according to an embodiment of this application. The communication apparatus 130 is configured to implement functions of the user plane function network element in the foregoing methods. The communication apparatus 130 may be the user plane function network element, an apparatus in the user plane function network element, or an apparatus that can be used with the user plane function network element. The communication apparatus 130 may be a chip system. In this embodiment of this application, the chip system may include a chip, or may include a chip and another discrete component. The communication apparatus 130 includes at least one processing module 1301 configured to implement the functions of the user plane function network element in the methods provided in the embodiments of this application. For example, the processing module 1301 may perform S504 and S509 in FIG. 5, S607 in FIG. 6, S707 in FIG. 7, S807 in FIG. 8, or S907 in FIG. 9. For details, refer to the detailed descriptions in the method examples. Details are not described herein again.

The communication apparatus 130 may further include at least one storage module 1302 configured to store program instructions and/or data. The storage module 1302 is coupled to the processing module 1301. The coupling in this embodiment of this application is indirect coupling or a communication connection between apparatuses, units, or modules for information exchange between the apparatuses, the units, or the modules, and may be in electrical, mechanical, or other forms. The processing module 1301 may cooperate with the storage module 1302. The processing module 1301 may execute the program instructions stored in the storage module 1302. At least one of the at least one storage module may be included in the processing module.

The communication apparatus 130 may further include a communication module 1303 configured to communicate with another device through a transmission medium, such that an apparatus in the communication apparatus 130 can communicate with the other device. The communication module 1303 is used by the apparatus to communicate with the other device. For example, the processing module 1301 performs S507 in FIG. 5 through the communication module 1303.

When the processing module 1301 is a processor, the storage module 1302 is a memory, and the communication module 1303 is a communication interface, the communication apparatus 130 in FIG. 13 in this embodiment of this application may be the communication apparatus 40 shown in FIG. 4.

As described above, the communication apparatus 120 or the communication apparatus 130 provided in the embodiments of this application may be configured to implement functions of the user plane function network element in the methods implemented in the foregoing embodiments of this application. For ease of description, only a part related to the embodiments of this application is shown. For technical details that are not disclosed, refer to the embodiments of this application.

Figure 14:
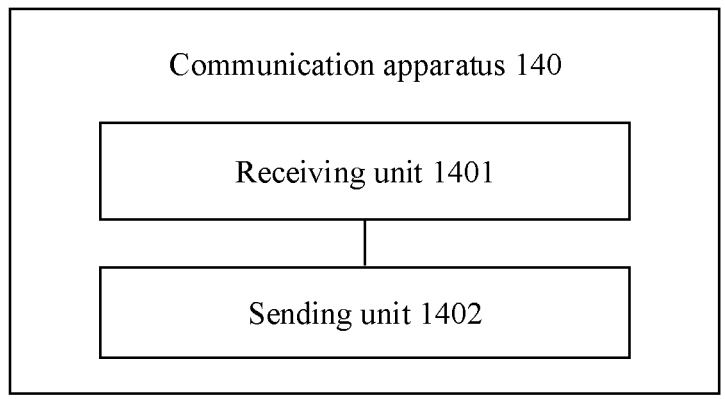
FIG. 14 is a schematic diagram of a structure of yet another communication apparatus according to an embodiment of this application.

When each functional module is obtained through division based on each corresponding function, FIG. 14 shows a communication apparatus 140 according to an embodiment of this application. The communication apparatus 140 is configured to implement functions of the user equipment in the foregoing methods. The communication apparatus 140 may be the user equipment, an apparatus in the user equipment, or an apparatus that can be used with the user equipment. The communication apparatus 140 may be a chip system. In this embodiment of this application, the chip system may include a chip, or may include a chip and another discrete component. As shown in FIG. 14, the communication apparatus 140 may include a receiving unit 1401 and a sending unit 1402. The receiving unit 1401 is configured to perform S505 in FIG. 5. The sending unit 1402 is configured to perform S506 in FIG. 5. All related content of the steps in the foregoing method embodiments may be cited in function descriptions of corresponding functional modules. Details are not described herein again.

Figure 15:
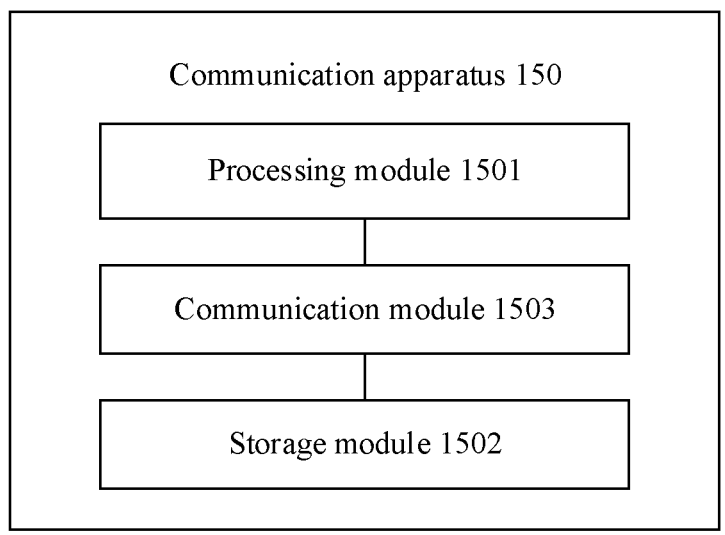
FIG. 15 is a schematic diagram of a structure of yet another communication apparatus according to an embodiment of this application.

When an integrated unit is used, FIG. 15 shows a communication apparatus 150 according to an embodiment of this application. The communication apparatus 150 is configured to implement functions of the user equipment in the foregoing methods. The communication apparatus 150 may be the user equipment, an apparatus in the user equipment, or an apparatus that can be used with the user equipment. The communication apparatus 150 may be a chip system.

The communication apparatus 150 includes at least one processing module 1501 configured to implement the functions of the user equipment in the methods provided in the embodiments of this application.

The communication apparatus 150 may further include at least one storage module 1502 configured to store program instructions and/or data. The storage module 1502 is coupled to the processing module 1501. The coupling in this embodiment of this application is indirect coupling or a communication connection between apparatuses, units, or modules for information exchange between the apparatuses, the units, or the modules, and may be in electrical, mechanical, or other forms. The processing module 1501 may cooperate with the storage module 1502. The processing module 1501 may execute the program instructions stored in the storage module 1502. At least one of the at least one storage module may be included in the processing module.

The communication apparatus 150 may further include a communication module 1503 configured to communicate with another device through a transmission medium, to determine that an apparatus in the communication apparatus 150 can communicate with the other device. The communication module 1503 is used by the apparatus to communicate with the other device. For example, the processing module 1501 performs processes S505 and S506 in FIG. 5 through the communication module 1503.

When the processing module 1501 is a processor, the storage module 1502 is a memory, and the communication module 1503 is a communication interface, the communication apparatus 150 in FIG. 15 in this embodiment of this application may be the communication apparatus 40 shown in FIG. 4.

As described above, the communication apparatus 140 or the communication apparatus 150 provided in the embodiments of this application may be configured to implement functions of the user equipment in the methods implemented in the foregoing embodiments of this application. For ease of description, only a part related to the embodiments of this application is shown. For technical details that are not disclosed, refer to the embodiments of this application.

According to another aspect, an embodiment of this application provides a communication system. The communication system includes a first communication apparatus, a second communication apparatus, and a third communication apparatus. The first communication apparatus may implement the method in any one of the first aspect or the possible implementations of the first aspect. The second communication apparatus may implement the method in any one of the second aspect or the possible implementations of the second aspect. The third communication apparatus may implement the method in any one of the third aspect or the possible implementations of the third aspect. For example, the first communication apparatus is a first network element, the second communication apparatus is a user plane function network element, and the third communication apparatus is user equipment.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

An embodiment of this application further provides a chip system. The chip system includes a processor configured to implement the technical methods in the embodiments of the present disclosure. In a possible design, the chip system further includes a memory configured to store program instructions and/or data that are/is necessary for the communication device in the embodiments of the present disclosure. In a possible design, the chip system further includes a memory configured to enable the processor to invoke application program code stored in the memory. The chip system may include one or more chips, or may include a chip and another discrete component. This is not specifically limited in this embodiment of this application.

The method or algorithm steps described with reference to the content disclosed in this application may be implemented by hardware, or may be implemented by a processor by executing software instructions. The software instructions may include a corresponding software module. The software module may be stored in a RAM, a flash memory, a ROM, an EPROM, an EEPROM, a register, a hard disk, a removable hard disk, CD-ROM, or any other form of storage medium well-known in the art. For example, a storage medium is coupled to a processor, such that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components. Alternatively, the memory may be coupled to the processor. For example, the memory may exist independently, and is connected to the processor through a bus. The memory may alternatively be integrated with the processor. The memory may be configured to store application program code for executing the technical solutions provided in the embodiments of this application, and the processor controls the execution. The processor is configured to execute the application program code stored in the memory, to implement the technical solutions provided in the embodiments of this application.

Based on the foregoing descriptions of the implementations, a person skilled in the art may understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes: any medium that can store program code, such as a Universal Serial Bus (USB) flash drive, a removable hard disk, a ROM, a RAM, a magnetic disk, or an optical disc.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
obtaining, by a first network element, a first address used by a user equipment to send a data packet of a first service to a user plane function network element, wherein the first address is obtained by allocating, based on a service identifier of the first service, the first address;
sending, by the first network element to the user plane function network element, a correspondence between the first address and address information of a first server that provides the first service, wherein the address information indicates a second address used by the user plane function network element to send the data packet to the first server;
obtaining, by the user plane function network element, the correspondence from the first network element;
receiving, by the user plane function network element, a third address from the user equipment, wherein the third address is the same as the first address; and
obtaining, by the user plane function network element based on the third address and the correspondence, a second server that provides the first service for the user equipment,
wherein the first server comprises the second server.

2. The method of claim 1, wherein the correspondence between the first address and the address information of the first server is used to obtain the second server that provides the first service for the user equipment.

3. The method of claim 1, further comprising:
obtaining, by the first network element, location information of the first service provided by the first server; and
sending, by the first network element, the location information to the user plane function network element to obtain the second server that provides the first service for the user equipment.

4. The method of claim 1, further comprising obtaining, by the first network element, the correspondence based on the service identifier of the first service.

5. The method of claim 1, further comprising sending, by the first network element, a second correspondence between the first address and the service identifier of the first service to the user equipment.

6. The method of claim 1, wherein the first network element is a session management network element or a policy control network element, and wherein the method further comprises:
receiving, by the first network element, the service identifier of the first service and the address information from the first server; or
obtaining, by the first network element, the service identifier of the first service and the address information from the first server through a unified data management network element or a unified data repository network element.

7. The method of claim 1, wherein the first network element is the first server, wherein sending the correspondence comprises sending, by the first server, the correspondence to the user plane function network element through a second network element, and wherein the second network element is a session management network element, a policy control network element, a unified data repository network element, or a unified data management network element.

8. The method of claim 1, wherein obtaining the correspondence comprises:
obtaining, by the user plane function network element, the correspondence from a session management network element, wherein the correspondence is received from the first server at a unified data management network element or a unified data repository network element and is obtained by the session management network element from unified data management network element or the unified data repository network element, respectively; or
obtaining, by the user plane function network element, the correspondence from a policy control network element through the session management network element, and wherein the correspondence is received from the first server at the policy control network element, and wherein the correspondence is received from the first server at the unified data management network element or the unified data repository network element and is obtained by the policy control network element from the unified data management network element or the unified data repository network element, respectively.

9. The method of claim 1, further comprising:
obtaining, by the user plane function network element, first location information of the first service provided by the first server; and
obtaining, by the user plane function network element, second location information of the user equipment accessing a network.

10. A system, comprising:
a first network element configured to:
obtain a first address used by a user equipment to send a data packet of a first service; and
send a correspondence between the first address and address information of a first server that provides the first service; and a user plane function network element configured to:
- send, using a second address indicated by the address information, the data packet of the first service to the first server;
- obtain the correspondence from the first network element, wherein the first network element is a session management network element, wherein the correspondence is received from the first server at a unified data management network element or a unified data repository network element and is obtained by the session management network element from the unified data management network element or the unified data repository network element, respectively, or
- obtain the correspondence from a policy control network element through the session management network element, wherein the correspondence is received from the first server at the policy control network element, and the correspondence is received from the first server at the unified data management network element or the unified data repository network element and is obtained by the policy control network element from the unified data management network element or the unified data repository network element, respectively;
- receive a third address from the user equipment, wherein the third address is the same as the first address; and
- obtain, based on the third address and the correspondence, a second server that provides the first service for the user equipment, wherein the first server comprises the second server.

11. The system of claim 10, wherein the correspondence is used to obtain the second server that provides the first service for the user equipment.

12. The system of claim 10, wherein the first network element is configured to allocate the first address based on a service identifier of the first service.

13. The system of claim 10, wherein the first network element is further configured to:
- obtain location information of the first service provided by the first server; and
- send the location information to the user plane function network element to obtain the second server that provides the first service for the user equipment.

14. The system of claim 12, wherein the first network element is further configured to obtain the correspondence based on the service identifier of the first service.

15. The system of claim 12, wherein the first network element is further configured to send a second correspondence between the first address and the service identifier of the first service to the user equipment.

16. The system of claim 12, wherein the first network element is the session management network element or the policy control network element, and wherein the first network element is further configured to:
- receive the service identifier of the first service and the address information from the first server; or
- obtain the service identifier of the first service and the address information from the first server through the unified data management network element or the unified data repository network element.

17. The system of claim 10, wherein the first network element is the first server, wherein the first network element is configured to send the correspondence to the user plane function network element through a second network element, and wherein the second network element is a session management network element, a policy control network element, a unified data repository network element, or a unified data management network element.

18. The system of claim 10, wherein the user plane function network element is further configured to:
- obtain first location information of the first service provided by the first server; and
- obtain second location information of the user equipment accessing a network.

19. A method, comprising:
- obtaining, by a first network element, a first address used by a user equipment to send a data packet of a first service to a user plane function network element;
- sending, by the first network element through a second network element to the user plane function network element, a correspondence between the first address and address information of a first server that provides the first service, wherein the first network element is the first server, wherein the address information indicates a second address used by the user plane function network element to send the data packet to the first server, and wherein the second network element is a session management network element, a policy control network element, a unified data repository network element, or a unified data management network element;
- obtaining, by the user plane function network element, the correspondence from the first network element;
- receiving, by the user plane function network element, a third address from the user equipment, wherein the third address is the same as the first address; and
- obtaining, by the user plane function network element based on the third address and the correspondence, a second server that provides the first service for the user equipment.

20. The method of claim 19, wherein the correspondence between the first address and the address information of the first server is used to obtain the second server that provides the first service for the user equipment.

* * * * *